United States Patent
Kobayashi et al.

(10) Patent No.: US 11,400,633 B2
(45) Date of Patent: Aug. 2, 2022

(54) EXTRUDER SCREW PASSAGES, EXTRUDER AND EXTRUSION METHOD

(71) Applicants: Toshiba Kikai Kabushiki Kaisha, Tokyo (JP); HSP Technologies Inc., Tsukuba (JP)

(72) Inventors: Akiyoshi Kobayashi, Fuji (JP); Shigeyuki Fujii, Numazu (JP); Takafumi Sameshima, Mishima (JP); Hiroshi Shimizu, Tsukuba (JP)

(73) Assignees: Toshiba Kikai Kabushiki Kaisha, Tokyo (JP); HSP Technologies Inc., Tsukuba (JP)

( * ) Notice: Subject to any disclaimer, the term of this patent is extended or adjusted under 35 U.S.C. 154(b) by 573 days.

(21) Appl. No.: 15/280,424

(22) Filed: Sep. 29, 2016

(65) Prior Publication Data
US 2017/0021547 A1 Jan. 26, 2017

Related U.S. Application Data

(63) Continuation of application No. PCT/JP2015/060639, filed on Apr. 3, 2015.

(30) Foreign Application Priority Data

Apr. 10, 2014 (JP) .............................. JP2014-081252
Mar. 27, 2015 (JP) .............................. JP2015-066280

(51) Int. Cl.
*B29C 48/515* (2019.01)
*B29C 48/395* (2019.01)
(Continued)

(52) U.S. Cl.
CPC ............ *B29C 48/515* (2019.02); *B29B 7/426* (2013.01); *B29B 7/429* (2013.01); *B29B 7/483* (2013.01);
(Continued)

(58) Field of Classification Search
CPC ........... B29B 7/489; B29B 7/847; B29B 7/82; B29B 7/90; B29B 7/845; B29B 7/42;
(Continued)

(56) References Cited

U.S. PATENT DOCUMENTS 3,305,894 A * 2/1967 Pfaff .................... B30B 11/246
366/85
3,371,379 A * 3/1968 Reifenhauser ...... B29C 44/0492
96/196

(Continued)

FOREIGN PATENT DOCUMENTS

DE 2454785 * 5/1976
EP 3650196 A1 * 5/2020

(Continued)

OTHER PUBLICATIONS

International Search Report (with Translation) issued in PCT/JP2015/060639 dated May 26, 2015.

(Continued)

*Primary Examiner* — Charles Cooley
(74) *Attorney, Agent, or Firm* — DLA Piper LLP US

(57) ABSTRACT

An extruder screw includes a screw body. The screw body is rotated about an axis parallel to a direction of conveyance of a raw material. A conveyance portion having a flight is provided on the outer peripheral surface of the screw body. The flight is configured to convey the raw material along the axis of the screw body when the screw body is rotated. A passage for permitting the raw material fed by the flight to pass therethrough to the outer peripheral surface of the screw body is provided in the screw body in a position deviated from the axis of the screw body.

11 Claims, 31 Drawing Sheets

(51) Int. Cl.
<table>
<tr><td>B29C 48/68</td><td>(2019.01)</td></tr>
<tr><td>B29C 48/285</td><td>(2019.01)</td></tr>
<tr><td>B29C 48/355</td><td>(2019.01)</td></tr>
<tr><td>B29C 48/88</td><td>(2019.01)</td></tr>
<tr><td>B29B 7/82</td><td>(2006.01)</td></tr>
<tr><td>B29B 7/48</td><td>(2006.01)</td></tr>
<tr><td>B29B 7/42</td><td>(2006.01)</td></tr>
<tr><td>B29B 7/84</td><td>(2006.01)</td></tr>
<tr><td>B29C 48/55</td><td>(2019.01)</td></tr>
<tr><td>B29C 48/00</td><td>(2019.01)</td></tr>
<tr><td>B29C 48/51</td><td>(2019.01)</td></tr>
<tr><td>B29C 48/385</td><td>(2019.01)</td></tr>
<tr><td>B29C 48/76</td><td>(2019.01)</td></tr>
<tr><td>B29C 48/40</td><td>(2019.01)</td></tr>
<tr><td>B29C 48/57</td><td>(2019.01)</td></tr>
<tr><td>B29C 48/54</td><td>(2019.01)</td></tr>
<tr><td>B29C 48/80</td><td>(2019.01)</td></tr>
<tr><td>B29K 33/00</td><td>(2006.01)</td></tr>
<tr><td>B29K 69/00</td><td>(2006.01)</td></tr>
</table>

(52) U.S. Cl.
CPC ............. *B29B 7/487* (2013.01); *B29B 7/489* (2013.01); *B29B 7/82* (2013.01); *B29B 7/845* (2013.01); *B29C 48/023* (2019.02); *B29C 48/298* (2019.02); *B29C 48/355* (2019.02); *B29C 48/397* (2019.02); *B29C 48/51* (2019.02); *B29C 48/55* (2019.02); *B29C 48/68* (2019.02); *B29C 48/911* (2019.02); *B29C 48/385* (2019.02); *B29C 48/402* (2019.02); *B29C 48/54* (2019.02); *B29C 48/57* (2019.02); *B29C 48/767* (2019.02); *B29C 48/834* (2019.02); *B29K 2033/12* (2013.01); *B29K 2069/00* (2013.01)

(58) Field of Classification Search
CPC ....... B29B 7/421; B29B 7/823; B29B 7/7485; B29B 7/7461; B29B 7/429; B29B 7/482; B29B 7/422; B29B 7/726; B29C 47/402; B29C 47/6018; B29C 47/622; B29C 47/6056; B29C 47/6012; B29C 48/82; B29C 48/802; B29C 48/625; B29C 48/385; B29C 48/535; B29C 48/55; B29C 48/54; B29C 48/72; B29C 48/402; B29C 48/74; B29C 48/745; B29C 48/725; B29K 2105/251; B29K 2023/12; B29K 2509/00
USPC ............................... 425/200–209; 366/79–91
See application file for complete search history.

(56) References Cited

U.S. PATENT DOCUMENTS

| | | | | | |
|---|---|---|---|---|---|
| 3,503,944 | A * | 3/1970 | Heinrich | ................. | B29C 48/72 526/88 |
| 3,712,594 | A * | 1/1973 | Schippers | ................ | B29C 47/60 159/2.2 |
| 3,746,318 | A * | 7/1973 | Schippers | ................. | B29B 7/42 366/79 |
| 3,924,842 | A * | 12/1975 | Klein | .................... | B29C 48/725 366/79 |
| 3,999,921 | A * | 12/1976 | Thor | ......................... | B29B 7/42 425/208 |
| 4,290,702 | A * | 9/1981 | Klein | ..................... | B29C 45/50 366/293 |
| 4,302,409 | A * | 11/1981 | Miller | ..................... | B29C 44/22 264/45.9 |
| 4,387,997 | A * | 6/1983 | Klein | ..................... | B29C 45/50 366/295 |
| 4,472,059 | A * | 9/1984 | Klein | ..................... | B29C 47/38 366/293 |
| 4,637,790 | A * | 1/1987 | Klein | ................. | B29C 47/6006 366/293 |
| 4,802,140 | A * | 1/1989 | Dowling | ................... | B29B 7/42 366/79 |
| 8,048,948 | B2 * | 11/2011 | Shimizu | ................... | B29B 7/90 524/442 |
| 8,975,336 | B2 * | 3/2015 | Shimizu | ................. | B29B 7/125 525/185 |
| 9,199,393 | B2 * | 12/2015 | Shimizu | .................... | B29B 7/14 |
| 10,967,554 | B2 * | 4/2021 | Kobayashi | ............. | B29C 48/51 |
| 11,072,104 | B2 * | 7/2021 | Kobayashi | ............. | B29C 48/51 |
| 11,110,638 | B2 * | 9/2021 | Kobayashi | .......... | B29C 48/2511 |
| 11,220,022 | B2 * | 1/2022 | Kobayashi | ............ | B29C 48/535 |
| 11,224,991 | B2 * | 1/2022 | Kobayashi | ............ | B29C 48/535 |
| 11,229,889 | B2 * | 1/2022 | Kobayashi | .............. | B29B 7/42 |
| 11,230,033 | B2 * | 1/2022 | Kobayashi | .............. | B29B 7/726 |
| 2016/0332331 | A1 * | 11/2016 | Kobayashi | ............ | B29C 48/395 |
| 2016/0332332 | A1 * | 11/2016 | Kobayashi | ................ | B29B 7/42 |
| 2017/0021547 | A1 * | 1/2017 | Kobayashi | .............. | B29B 7/421 |
| 2017/0050366 | A1 * | 2/2017 | Kobayashi | ............. | B29C 48/385 |
| 2017/0050367 | A1 * | 2/2017 | Kobayashi | .............. | B29B 7/421 |
| 2017/0113394 | A1 * | 4/2017 | Kobayashi | ............. | B29C 47/64 |
| 2017/0225360 | A1 * | 8/2017 | Kobayashi | ............. | B29C 48/76 |
| 2017/0225379 | A1 * | 8/2017 | Kobayashi | ............ | B29C 48/505 |
| 2018/0093233 | A1 * | 4/2018 | Kobayashi | .............. | B29B 7/421 |
| 2018/0093234 | A1 * | 4/2018 | Kobayashi | ................ | B29B 7/42 |
| 2019/0352472 | A1 * | 11/2019 | Sameshima | .............. | C08K 3/04 |
| 2021/0154906 | A1 * | 5/2021 | Kobayashi | ............. | B29C 48/51 |
| 2021/0316492 | A1 * | 10/2021 | Kobayashi | ............ | B29C 48/385 |
| 2021/0362374 | A1 * | 11/2021 | Sameshima | ............. | C08L 23/10 |

FOREIGN PATENT DOCUMENTS

| | | |
|---|---|---|
| JP | S52-72573 U | 5/1977 |
| JP | S 56-37054 | 8/1981 |
| JP | S 57-72838 | 5/1982 |
| JP | S 58-25943 | 2/1983 |
| JP | H07-266404 | 10/1995 |
| JP | 2009-045804 | 3/2009 |
| JP | 2011-046104 | 3/2011 |
| JP | 2012-051289 | 3/2012 |
| JP | 2013-071428 | 4/2013 |
| WO | WO 2010-061872 | 6/2010 |

OTHER PUBLICATIONS

Written Opinion issued in PCT/JP2015/060639 dated May 26, 2015.
Taiwanese Office Action (with Translation) issued in Taiwan Application No. 104111610 dated Aug. 25, 2016.
English Language Abstract and Translation of JPS 56-37054 published Aug. 28, 1981.
English Language Abstract and Translation of JPS 57-72838 published May 7, 1982.
English Language Abstract and Translation of JP 2009-045804 published Mar. 5, 2009.
English Language Abstract and Translation of JP 2011-046104 published Mar. 10, 2011.
English Language Abstract and Translation of JP 2012-051289 published Mar. 15, 2012.
English Language Abstract and Translation of JP 2013-071428 published Apr. 22, 2013.
English Language Abstract and Translation of WO 2010-061872 published Jun. 3, 2010.
Japanese Office Action issued in JP 2015-066280 dated Aug. 21, 2018.
German Office Action in Application No. 11 2015 001 737.2, dated Jul. 30, 2021.

* cited by examiner

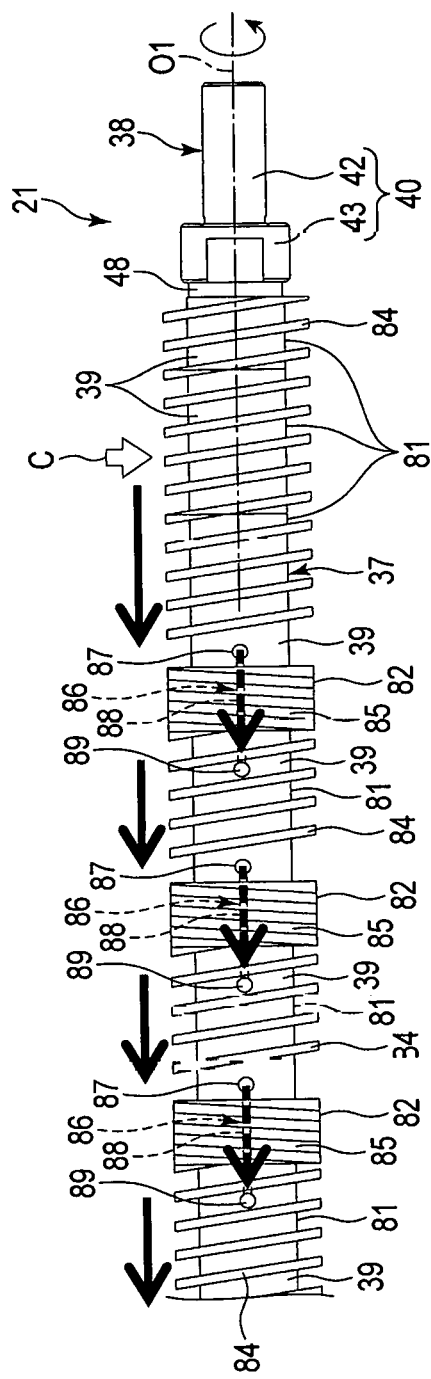
F I G. 21

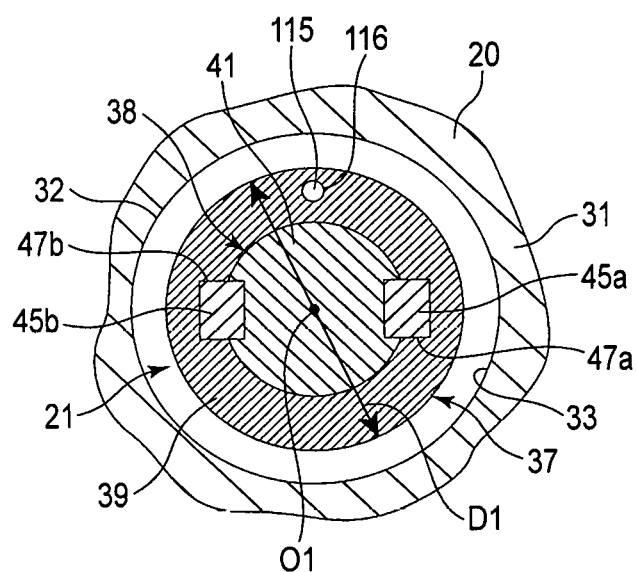
F I G. 27

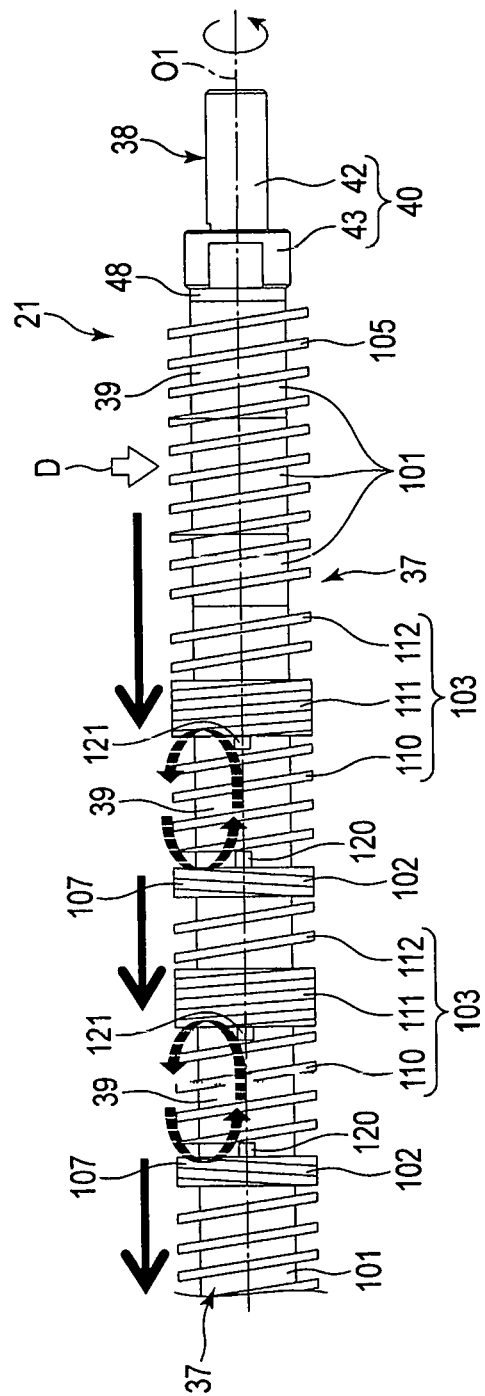
F I G. 30

EXTRUDER SCREW PASSAGES, EXTRUDER AND EXTRUSION METHOD

CROSS REFERENCE TO RELATED APPLICATIONS

This application is a Continuation Application of PCT Application No. PCT/JP2015/060639, filed Apr. 3, 2015 and based upon and claiming the benefit of priority from prior Japanese Patent Applications No. 2014-081252, filed Apr. 10, 2014; and No. 2015-066280, filed Mar. 27, 2015, the entire contents of all of which are incorporated herein by reference.

BACKGROUND OF THE INVENTION

1. Field of the Invention

Embodiments described herein relate to an extruder screw for kneading a blended raw material while applying thereto a shearing action and an extension action, and also relate to an extruder and an extrusion method for producing a kneaded product using the extruder screw.

2. Description of the Related Art

For instance, when a raw material obtained by blending a plurality of incompatible resin materials is kneaded by an extruder having its screw set at a rotational speed of about 300 rpm, it is necessary to add a compatibilizer having affinity or adhesiveness to one or both of the blended components. However, even if the compatibilizer is used, the blended components are not dissolved on the molecular level, which imposes limitations on enhancement of the performance or functionality of a kneaded product produced by the extruder.

In order to overcome the above problem, a batch-type high-shearing molding apparatus has been developed which can produce a kneaded product wherein its raw materials are kneaded on the nanolevel without any additive, such as the compatibilizer.

The batch-type high-shearing molding apparatus according to Patent Literature 1 comprises a feedback-type screw housed in a cylinder. This screw has a structure capable of sufficiently kneading, inside the screw, a raw material obtained by blending incompatible resin materials.

More specifically, the screw has an axis extending in a direction of convenyance of the raw material, and is configured to rotate about the axis within the cylinder. A helical flight is formed at the outer periphery of the screw. The flight conveys the raw material, supplied to the proximal end of the screw, toward the tip end of the screw. The raw material conveyed by the flight is filled into a gap between the tip end face of the screw and a seal member that closes the open end of the cylinder.

The screw has a hole with an inner diameter of about 1 to 5 mm at substantially the center thereof. This hole extends along the axis of the screw. The upstream end of the hole opens to the gap at the tip end face of the screw. The downstream end of the hole is bifurcated and opens to the outer periphery of the proximal end of the screw.

The raw material filled in the gap flows from the upstream end of the hole into the hole in accordance with the rotation of the screw, and is returned from the downstream end of the hole to the outer periphery of the proximal end of the screw. The returned raw material is again conveyed by the flight into the gap.

Since the screw is thus made to be of a feedback type, the raw material supplied to the screw is subjected to a shearing action during the conveyance by the flight, and to an extension action during passing through the hole.

As a result, the raw material is circulated through the closed space inside the cylinder, while it is subjected to the shearing action and the extension action. In accordance with the time required for this circulation of the raw material, the macromolecular component of the raw material is subjected to nanodispersion, whereby a kneaded product having a nanoscopical dispersion structure can be obtained.

In the above-mentioned high-shearing molding apparatus, a hole, into which a raw material filled in a gap flows, is positioned on the axis of the screw. In this structure, the inner wall of the screw that defines the hole is rotated in accordance with the rotation of the screw, and hence the raw material is stirred along the circumference of the hole when it passed through the hole.

As a result, the raw material passing through the hole is subjected to a shearing action caused by the circumferential stirring, as well as the extension action, which makes it difficult to universally express the kneaded state of the raw material. Accordingly, there is a room for improvement in optimization of conditions for kneading of the raw material.

It is an object of the invention to provide an extruder screw capable of causing raw materials passing through a passage in a screw body to be relatively free from receiving a shearing action, thereby accurately controlling the degree of kneading of the raw materials.

It is another object to provide an extruder capable of producing a kneaded product having a nanoscopical dispersion structure in which the macromolecular component of the raw materials is nano-dispersed, and also to provide an extrusion method for use in the extruder.

BRIEF SUMMARY OF THE INVENTION

To attain one of the above-mentioned objects, an extruder screw according to one embodiment comprises a screw body. The screw body is rotated about an axis extending in a direction of conveyance of a raw material. A conveyance portion including a flight is provided on an outer peripheral surface of the screw body. The flight is configured to convey the raw material along the axis of the screw body when the screw body is rotated. A passage for permitting the raw material conveyed by the flight to pass therethrough to the outer peripheral surface of the screw body is provided in the screw body. The passage is provided in a position deviated from the axis of the screw body.

According to a preferable aspect, the passage is configured to revolve around the axis when the screw body is rotated.

According to another preferable aspect, the screw body has a cylindrical wall surface which defines the passage, and the cylindrical wall surface is configured to revolve around the axis, instead of rotating about the axis.

According to yet another preferable aspect, the passage has an inlet and an outlet which are open to the outer peripheral surface of the screw body. The inlet and the outlet are separate from each other along the axis of the screw body. The raw material flowing into the passage through the inlet is returned to the outer peripheral surface of the screw body through the outlet.

According to a preferable aspect, the screw body has a barrier portion configured to increase the pressure of the raw material by restricting the flow of the raw material using the flight, and the inlet is positioned in front of the barrier portion.

According to a further preferable aspect, the passage has a main passage communicating with the inlet and the outlet, and the main passage has a diameter smaller than the diameter of the inlet.

To attain one of the above-mentioned objects, an extruder screw according to one embodiment comprises a screw body. The screw body which has an axis extending in a direction of conveyance of a raw material, and is rotated about the axis. A conveyance portion having a flight is provided on the outer peripheral surface of the screw body. The flight is configured to convey the raw material along the axis of the screw body when the screw body is rotated. A plurality of passages for permitting the raw material conveyed by the flight to flow therein and return to the outer peripheral surface of the screw body are provided in the screw body. The passages are provided at intervals along the axis of the screw body in positions deviated from the axis of the screw body.

According to a preferable aspect, the passages are arranged at intervals along circumference of the screw body.

According to another preferable aspect, a coolant passage for permitting a coolant for cooling the screw body to flow therein is formed in the screw body.

To attain the other object, an extruder according to one embodiment is an extruder configured to knead a raw material using the screw to produce a kneaded product, and comprises a barrel containing the screw such that the screw is rotatable, a feed port provided in the barrel to feed the raw material to the screw, and a discharge port provided in the barrel to discharge the kneaded product.

To attain the other object, an extrusion method according to one embodiment is characterized by feeding a raw material to a screw rotating in a barrel, and continuously conveying the raw material along an axis of the screw, using a flight formed on an outer peripheral surface of the screw. The method is also characterized by guiding the raw material conveyed by the flight to a passage which revolves in the screw in accordance with the rotation of the screw, and returning the material through the passage to the outer peripheral surface of the screw, when the screw is rotated.

According to a preferable aspect, the flow of the raw material is restricted using a barrier portion provided in the screw, to increase the pressure of the raw material, and the pressure-increased material is introduced into the passage from the outer peripheral surface of the screw.

According to the invention, the internal passage of the screw body revolves around the axis of the screw, instead of rotating about the axis. This causes a raw material having passed through the passage and returning to the outer peripheral surface of the screw body to be relatively free from receiving a shearing action, and causes the raw material to mainly receive an extension action.

That is, the portion on the screw, where the shearing action is exerted on the raw material, and the portion on the same, where the extension action is exerted on the material, are determined, and therefore the degree of kneading of the raw material can be accurately controlled. As a result, a kneaded product having a nanoscopical dispersion structure in which the macromolecular component of the raw material is nanodispersed can be produced.

BRIEF DESCRIPTION OF THE SEVERAL VIEWS OF THE DRAWING

FIG. 21 is a cross-sectional view showing the direction of flow of a raw material assumed in the third embodiment when the screw is rotated;

FIG. 27 is a cross-sectional view taken along line F27-F27 of FIG. 26;

FIG. 30 is a side view showing a direction of a raw material assumed in the fourth embodiment when the screw is rotated;

DETAILED DESCRIPTION OF THE INVENTION

First Embodiment

Referring now to FIGS. 1 to 12, a first embodiment will be described.

Figure 1:
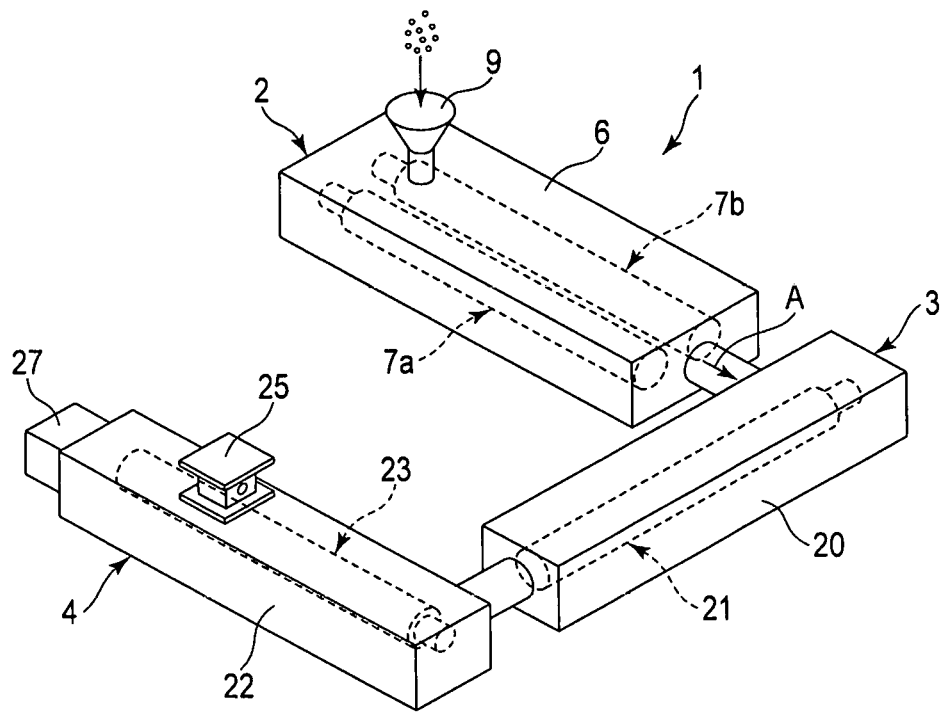
FIG. 1 is a schematic perspective view showing a continuous high-shearing processing apparatus according to a first embodiment.

FIG. 1 roughly shows the structure of a continuous high-shearing processing apparatus 1 according to the first embodiment. The high-shearing processing apparatus 1 comprises a first extruder 2, a second extruder 3 and a third extruder 4. The first extruder 2, the second extruder 3 and the third extruder 4 are connected in series.

The first extruder 2 is an element for preliminarily kneading, for example, two kinds of incompatible resin materials. As resin materials to be blended, methacrylate-base resin, such as poly methyl methacrylate (PMMA), and polycarbonate resin (PC) are used, for example. The two kinds of resin materials to be blended are supplied in the state of, for example, pellets to the first extruder 2.

Figure 2:
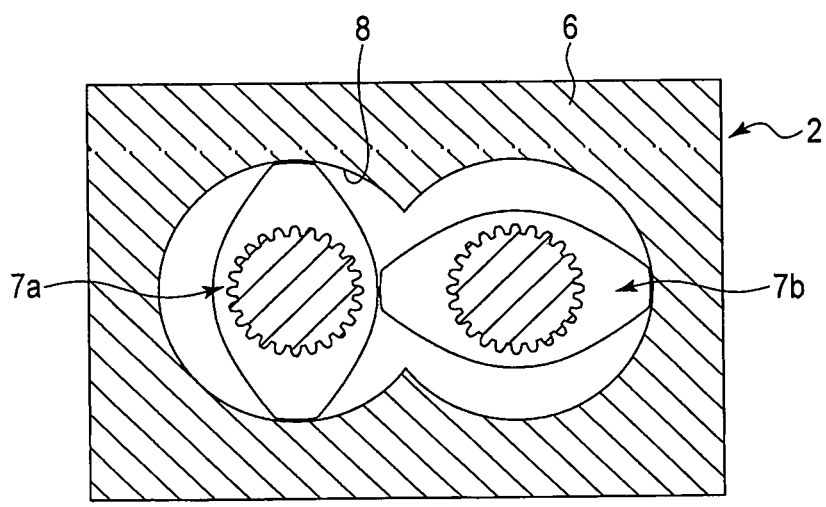
FIG. 2 is a cross-sectional view showing a first extruder employed in the first embodiment.
Figure 3:
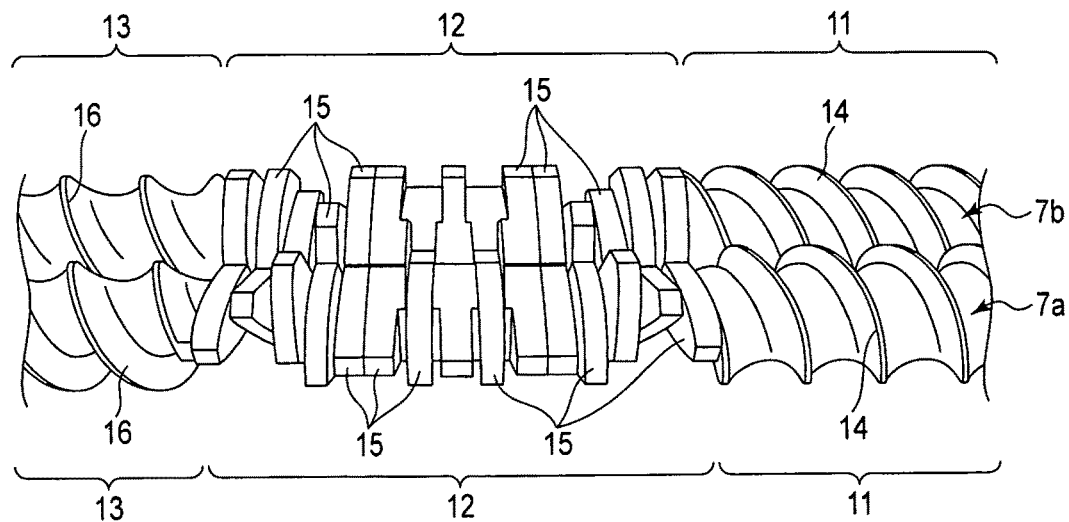
FIG. 3 is a perspective view showing a state in which the two screws of a first extruder are engaged with each other in the first embodiment.

In the embodiment, in order to increase the degree of kneading/melting of the resin materials, a biaxial kneading machine of a one-directional rotation type is used as the first extruder 2. FIGS. 2 and 3 show an example of the biaxial kneading machine. The biaxial kneading machine comprises a barrel 6 and two screws 7a and 7b accommodated in the barrel 6. The barrel 6 includes a cylindrical portion 8 having a shape obtained by combining two cylinders. The above-mentioned resin materials are continuously supplied to the cylindrical portion 8 through a feed portion 9 provided on one end of the barrel 6. The barrel 6 also comprises a heater for heating the resin materials supplied to the cylindrical portion 8.

Screws 7a and 7b are accommodated in the cylindrical portion 8, engaged with each other. Screws 7a and 7b are rotated in the same direction when they receive torque from a motor (not shown). As shown in FIG. 3, screws 7a and 7b each comprise a feed portion 11, a kneading portion 12, and a pumping portion 13. The feed portion 11, the kneading portion 12 and the pumping portion 13 are arranged along the axes of screws 7a and 7b.

The feed portion 11 has a helical flight 14. The flights 14 of screws 7a and 7b are rotated, engaged with each other, and convey, to the kneading portion 12, the two kinds of resin materials supplied from the feed portion 9.

The kneading portion 12 has a plurality of disks 15 arranged along the axis of each of screws 7a and 7b. The disks 15 of screws 7a and 7b are rotated in opposed states to thereby preliminarily knead the resin materials fed from the feed portion 11. The knead resin materials are fed into the pumping portion 13 in accordance with the rotation of screws 7a and 7b.

The pumping portion 13 has helical flights 16. Flights 16 of screws 7a and 7b are rotated, engaged with each other, thereby pushing out the preliminarily kneaded resin through the discharge end of the barrel 6.

In the above-described biaxial kneading machine, the resin materials supplied to the feed portions 11 of screws 7a and 7b are melted by the heat produced during the shearing action exerted in accordance with the rotation of screws 7a and 7b and the heat of the barrel 6 heated by a heater. The resin melted by the preliminary kneading in the biaxial kneading machine provides a blended raw material. This raw material is continuously supplied to the second extruder 3 through the discharge end of the barrel 6, as is indicated by arrow A of FIG. 1.

When the blended raw material is supplied to the second extruder 3, it is already melted by the preliminary kneading of the first extruder 2, and hence has mobility. This reduces the load of the second extruder 3 that completely kneads the blended raw material.

The second extruder 3 is an element for producing a kneaded material having a nanoscopical dispersion structure in which the macromolecular component of the raw material is nanodispersed. In the embodiment, a uniaxial extruder is used as the second extruder 3. The uniaxial extruder comprises a barrel 20 and a single screw 21. The screw 21 has a function of repeatedly applying a shearing action and an extension action to the molten raw material. The structure of the second extruder 3 will be described in detail later.

Figure 4:
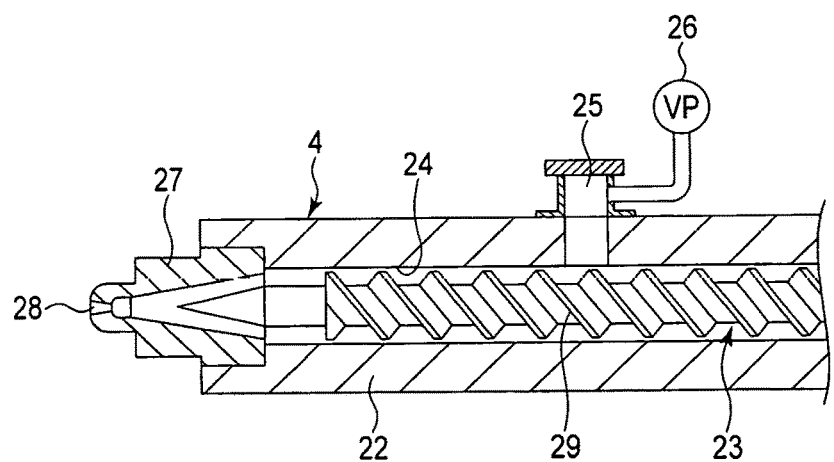
FIG. 4 is a cross-sectional view of a third extruder employed in the first embodiment.

The third extruder 4 is an element for removing a gas component contained in the kneaded material pushed out from the second extruder 3. In the embodiment, a uniaxial extruder is used as the third extruder 4. As shown in FIG. 4, the uniaxial extruder comprises a barrel 22 and a single vent screw 23 accommodated in the barrel 22. The barrel 22 includes a straight cylindrical portion 24. The kneaded material pushed out from the second extruder 3 is continuously supplied into the cylindrical portion 24 through one axial end thereof.

The barrel 22 has a vent port 25. The vent port 25 opens to the axial center of the cylindrical portion 24, and is connected to a vacuum pump 26. Further, the other end of the cylindrical portion 24 of the barrel 22 is closed by a head portion 27. The head portion 27 has a discharge port 28 for permitting the kneaded material to be discharged therethrough.

The vent screw 23 is accommodated in the cylindrical portion 24. The vent screw 23 is rotated in one direction by torque transmitted from a motor (not shown). The vent screw 23 has helical flight 29. Flight 29 is rotated along with the vent screw 23, thereby continuously conveying, to the head portion 27, the kneaded material supplied to the cylindrical portion 24.

When the kneaded material has reached a position corresponding to the vent port 25, it is subjected to the vacuum pressure of the vacuum pump 26. As a result, gaseous substances and other volatile substances are continuously removed from the kneaded material. The kneaded material, from which gaseous substances and other volatile substances have been removed, is continuously discharged to the outside of the high-shearing processing apparatus 1 through the discharge port 28 of the head portion 27.

Next, the second extruder 3 will be described in detail.

Figure 5:
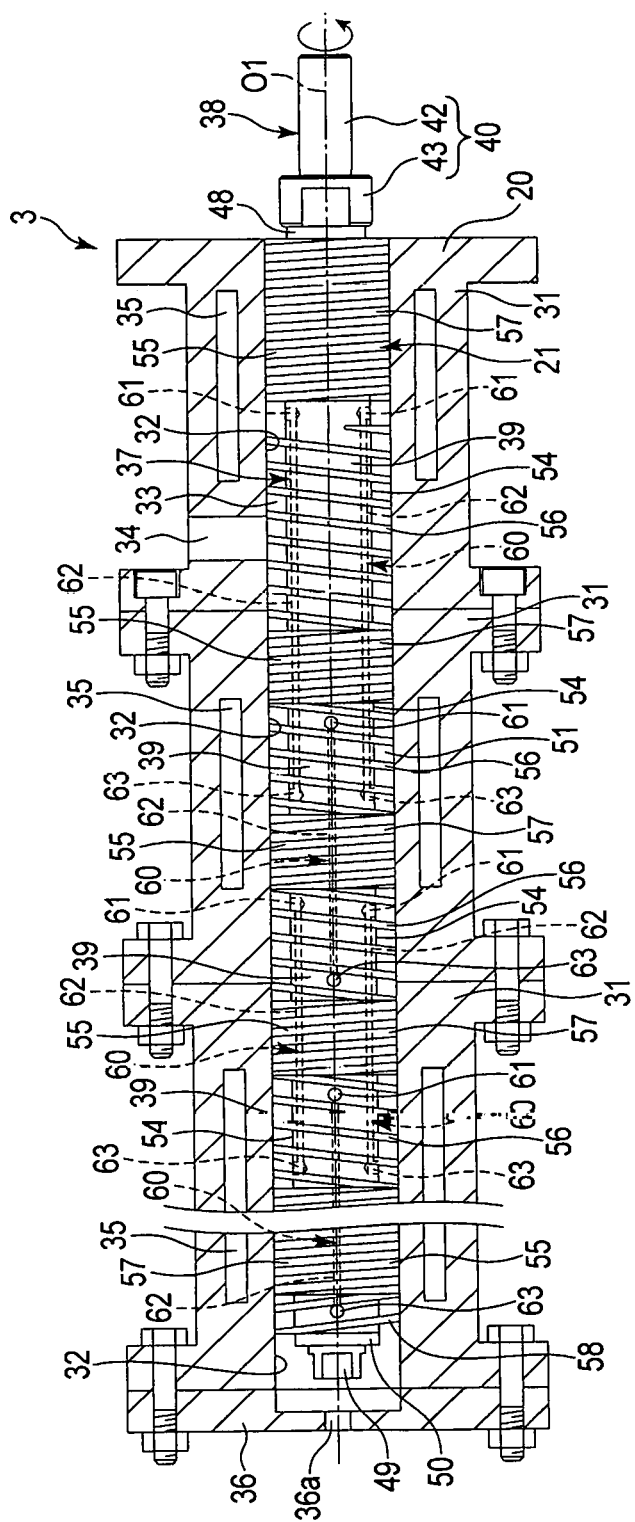
FIG. 5 is a cross-sectional view of a second extruder employed in the first embodiment.
Figure 6:
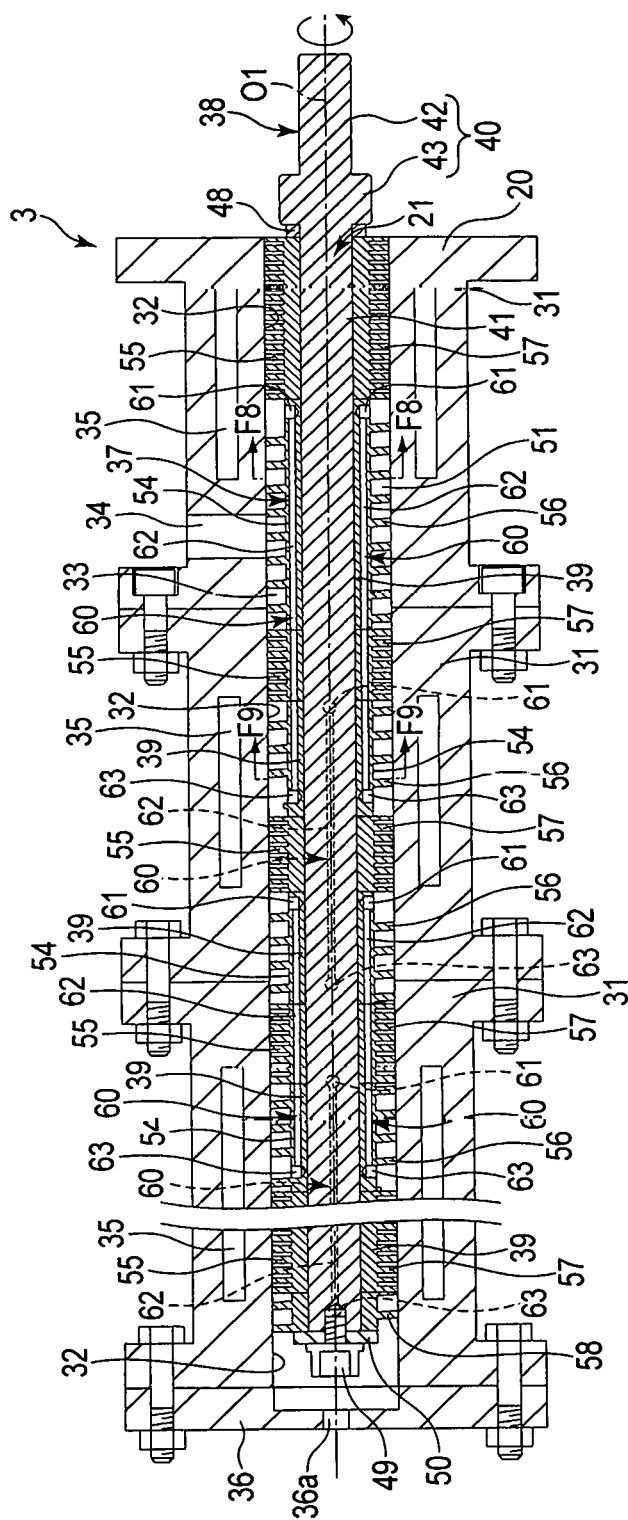
FIG. 6 is a cross-sectional view of the second extruder of the first embodiment, showing a barrel and a screw employed therein.

As shown in FIGS. 5 and 6, the barrel 20 of the second extruder 3 is a straight cylinder, and is arranged horizontally. The barrel 20 is divided into a plurality of barrel elements 31.

Each barrel element 31 has a cylindrical through hole 32. The barrel elements 31 are integrally coupled so that the through holes 32 are continuously arranged coaxially. The through holes 32 of the barrel elements 31 cooperate with each other to define a cylinder portion 33 inside the barrel 20. The cylinder portion 33 extends along the axis of the barrel 20.

A feed port 34 is formed in one axial end of the barrel 20. The feed port 34 communicates with the cylinder portion 33, and continuously receives a raw material blended by the first extruder 2.

The barrel 20 comprises a heater (not shown). The heater adjusts the barrel 20 to an optimal temperature for kneading the raw material. Further, the barrel 20 comprises a coolant passage 35 through which a coolant, such as water or oil, flows. The coolant passage 35 is arranged around the cylinder portion 33. The coolant flows along the coolant passage 35 when the temperature of the barrel 20 exceeds a predetermined upper limit, thereby forcedly cooling the barrel 20.

The other axial end of the barrel 20 is closed by a head portion 36. The head portion 36 has a discharge port 36a. The discharge port 36a is positioned on the axially opposite side of the barrel 20 with respect to the feed port 34, and is connected to the third extruder 4.

Figure 7:
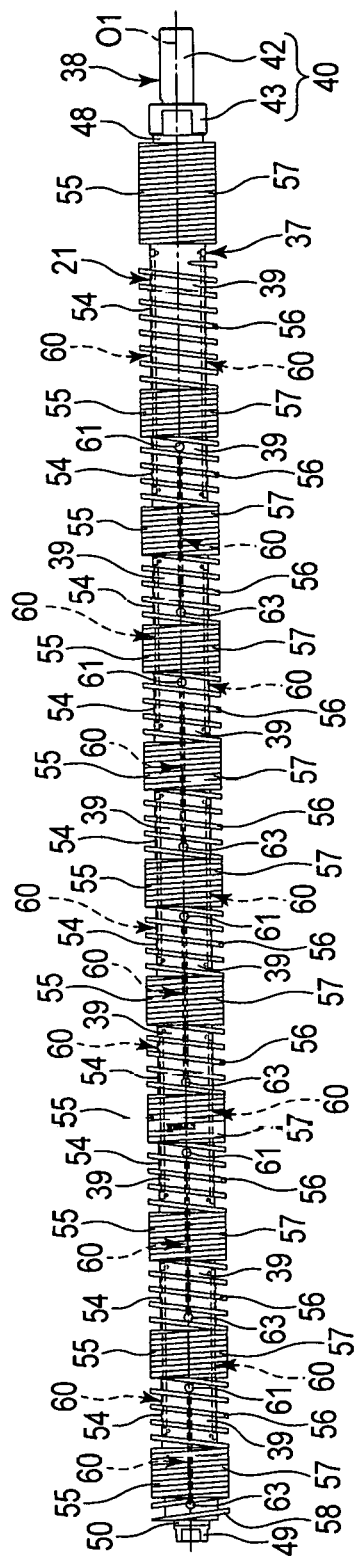
FIG. 7 is a side view of the screw of the first embodiment.

As shown in FIGS. 5 to 7, the screw 21 comprises a screw body 37. The screw body 37 of the embodiment comprises a single rotating shaft 38 and a plurality of cylindrical members 39.

The rotating shaft 38 comprises a first shaft portion 40 and a second shaft portion 41. The first shaft portion 40 is located at the proximal end of the rotating shaft 38 as an end of the barrel 20. The first shaft portion 40 includes a joint portion 42 and a stopper portion 43. The joint portion 42 is coupled to a drive source, such as a motor, through a coupling (not shown). The stopper portion 43 is arranged coaxially with the joint portion 42. The stopper portion 43 has a greater diameter than the joint portion 42. The second shaft portion 41 extends coaxially from an end of the stopper portion 43 of the first shaft portion 40. The second shaft portion 41 extends along substantially the entire length of the barrel 20, and has a distal end opposing the head portion 36.

Figure 8:
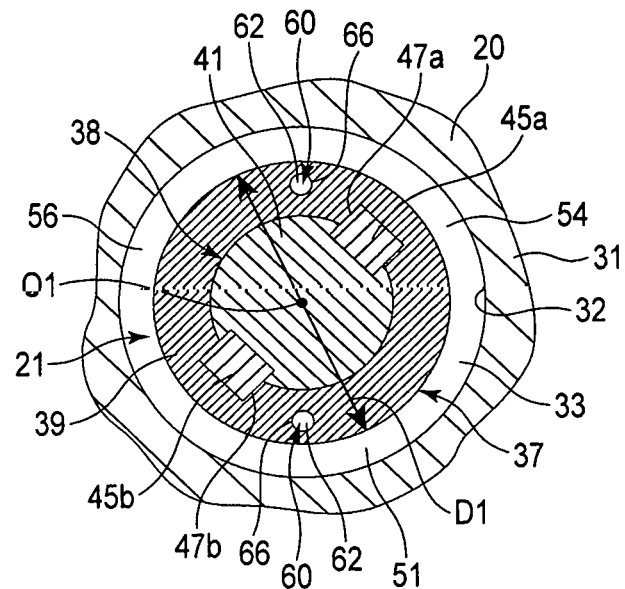
FIG. 8 is a cross-sectional view taken along line F8-F8 of FIG. 6.
Figure 9:
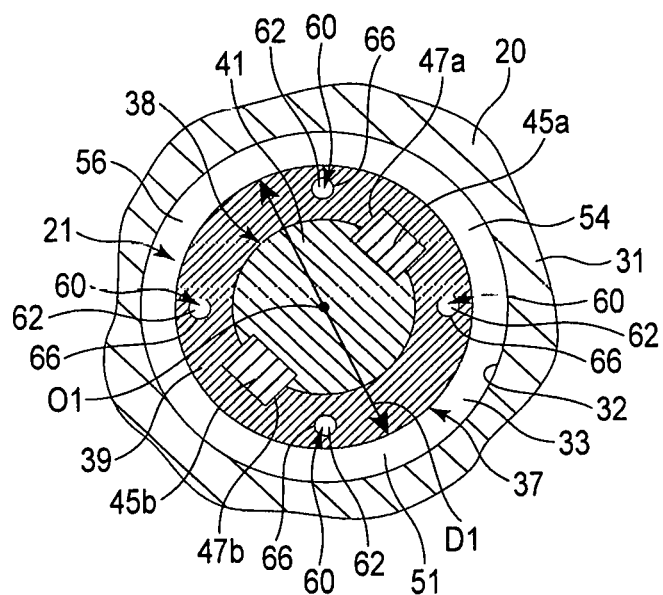
FIG. 9 is a cross-sectional view taken along line F9-F9 of FIG. 6.

The second shaft portion 41 is a solid cylindrical portion having a diameter smaller than the stopper portion 43. As shown in FIGS. 8 and 9, a pair of keys 45a and 45b are attached to the peripheral surface of the second shaft portion 41. Keys 45a and 45b axially extend along the second shaft portion 41, deviated from each other through 180 degrees with respect to the circumference of the second shaft portion 41.

Further, the screw body 37 has an axis O1. Axis O1 extends through the centers of the first and second shaft portions 40 and 41, and coincides with the axis of the rotating shaft 38.

As shown in FIGS. 6 to 10, the cylindrical members 39 are elements that define the outer diameter of the screw body 37, and are coaxially inserted around the second shaft portion 41. In the embodiment, the outer diameter D1 of all cylindrical members 39 is set identically.

Each cylindrical member 39 has end faces 39a at opposite axial ends thereof. Each end face 39a is a flat surface perpendicular to axis O1. A pair of key grooves 47a and 47b are formed in the inner peripheral surface of each cylindrical member 39. Key grooves 47a and 47b extend along the axis of each cylindrical member 39, deviated from each other through 180 degrees with respect to the circumference of each cylindrical member 39, and open the opposite end faces 39a of the same.

Each cylindrical member 39 is inserted onto the second shaft portion 41 from the direction of the distal end of the second shaft portion 41, with key grooves 47a and 47b engaged with keys 45a and 45b of the second shaft portion 41. In the embodiment, a first collar 48 is interposed between a cylindrical member 39 first inserted onto the second shaft portion 41 and the end face of the stopper portion 43 of the first shaft portion 40. After the insertion of all cylindrical members 39 onto the second shaft portion 41, a second collar 50 is fixed to the distal end surface of the second shaft portion 41 by a fixed screw 49.

The fixed screw 49 is an example of a fastening member, and the second collar 50 is an example of an end plate. By fixing the second collar 50 to the distal end surface of the second shaft portion 41, all cylindrical members 39 are tightened along the axis of the second shaft portion 41 between the first and second collars 48 and 50, whereby the end faces 39a of the adjacent cylindrical members 39 are attached to each other without gaps.

As a result, all cylindrical members 39 are coaxially coupled to each other on the second shaft portion 41, thereby constructing a segmented screw body 37 having a constant outer diameter. Further, the rotating shaft 38 and the cylindrical members 39 are assembled into an integral structure, which enables the cylindrical members 39 to rotate about axis O1 in accordance with the rotation of the rotating shaft 38.

In the embodiment, the cylindrical member 39 is not limited to be fixed to the rotating shaft 38 by keys 45a and 45b. For example, the cylindrical member 39 may be fixed to the rotating shaft 38, using a spline as shown in FIG. 2 instead of keys 45a and 45b.

The screw 21 is housed in the cylindrical portion 33 of the barrel 20. The screw body 37 of the screw 21 is coaxial with the cylindrical portion 33, and a conveyance passage 51 is formed between the outer peripheral surface of the screw body 37 and the inner peripheral surface of the cylindrical portion 33. As shown in FIGS. 8 and 9, the conveyance passage 51 has an annular transverse section when viewed radially with respect to the cylindrical portion 33, and extends along the axis of the cylindrical portion 33. The joint portion 42 and the stopper portion 43 of the rotating shaft 38 extend from an end of the barrel 20 to the outside of the barrel 20.

In the embodiment, when torque is transmitted from the drive source to the screw 21, the screw 21 rotates counterclockwise as indicated by the arrow of FIG. 5, if it is viewed from the proximal end of the rotating shaft 38. It is preferable to set the rotational speed of the screw 21 to 600 to 3000 rpm.

As shown in FIGS. 5 to 7 and 10, the screw body 37 has a plurality of conveyance portions 54 for conveying raw materials, and a plurality of barrier portions 55 for restricting the flow of the raw materials. The conveyance portions 54 and the barrier portions 55 are arranged alternately along the axis of the screw body (that is, along the length of the screw body 37).

The conveyance portions 54 have helical flights 56. Flights 56 project in the conveyance passage 51 from the outer peripheral surfaces of the cylindrical members 39, and the top portions of flights 56 constitute the outer peripheral surfaces of the conveyance portions 54. Flights 56 are twisted to cooperate to convey raw materials from the distal end of the screw body 37 to the proximal end of the same when the screw 21 is rotated counterclockwise. In other words, flights 56 are twisted counterclockwise like a left-handed screw.

The length of each conveyance portion 54 along the axis of the screw body 37 is suitably set in accordance with, for example, the sorts and/or the kneaded degrees of raw materials, and/or the quantity of a kneaded product per unit time. Furthermore, although the conveyance portions 54 are areas where flights 56 are formed at least on the outer peripheral surfaces of the cylindrical members 39, they are not limited to areas between the start and end points of flights 56.

That is, an area of the outer peripheral surface of the cylindrical member 39 deviated from flight 56 may be also regarded as the conveyance portion 54. Further, if a cylindrical spacer or collar is located adjacent to the cylindrical member 39 having flight 56, it may also be included in the conveyance portion 54.

The barrier portions 55 have respective helical flights 57. Flights 57 project in the conveyance passage 51 from the outer peripheral surfaces of the cylindrical members 39, and the top portions of flights 57 constitute the outer peripheral surfaces of the barrier portions 55. Flights 57 are twisted to cooperate to convey raw materials from the proximal end of the screw body 37 to the distal end of the same when the screw 21 is rotated counterclockwise. In other words, flights 57 are twisted clockwise like a right-handed screw.

The pitch of flight 57 is the same as or smaller than that of flight 56. Further, a slight clearance is secured between the tops of flights 56 and 57 and the inner peripheral surface of the cylindrical portion 33 of the barrel 20.

The length of the barrier portion 55 along the axis of the screw body 37 is suitably set in accordance with, for example, the sorts and/or the kneaded degrees of raw materials, and/or the quantity of a kneaded product per unit time. The barrier portion 55 functions to block the flow of raw materials sent from the conveyance portion 54. That is, the barrier portion 55 is located adjacent to the conveyance portion 54 on a downstream side with respect to the conveyance direction of the raw materials, and is configured to prevent the raw materials conveyed by the conveyance portion 54 from passing through the clearance between the top of flight 57 and the inner peripheral surface of the cylindrical portion 33.

In the embodiment, the barrier portion 55 is located on the proximal end of the screw body 37 corresponding to one end of the barrel 20, and a discharge flight 58 is provided on the distal end of the screw body 37 corresponding to the other end of the barrel 20. Discharge flight 58 projects in the conveyance passage 51 from the outer peripheral surface of the cylindrical member 39 located at the distal end of the screw body 37. Discharge flight 58 is twisted to convey raw materials from the proximal end of the screw body 37 to the distal end of the same. The feed port 34 of the barrel 20 faces the axially middle portion of the conveyance portion 54 nearest to the proximal end of the screw body 37.

In the embodiment, flights 56, 57 and 58 project in the conveyance passage 51 from a plurality of cylindrical members 39 having the same outer diameter D1. Thus, the outer peripheral surfaces of the cylindrical members 39 define the root diameter of the screw 21. The root diameter of the screw 21 is constant over the entire length of the screw 21.

As shown in FIGS. 5 to 7 and 10, the screw body 37 has a plurality of passages 60 extending along the axis of the screw body 37. The passages 60 are arranged at intervals along the axis of the screw body 37. Further, in the axially middle portion of the screw body 37, four passages 60 extending along the axis of the screw body 37 are arranged at intervals of 90 degrees along the circumference of the screw body 37.

Figure 10:
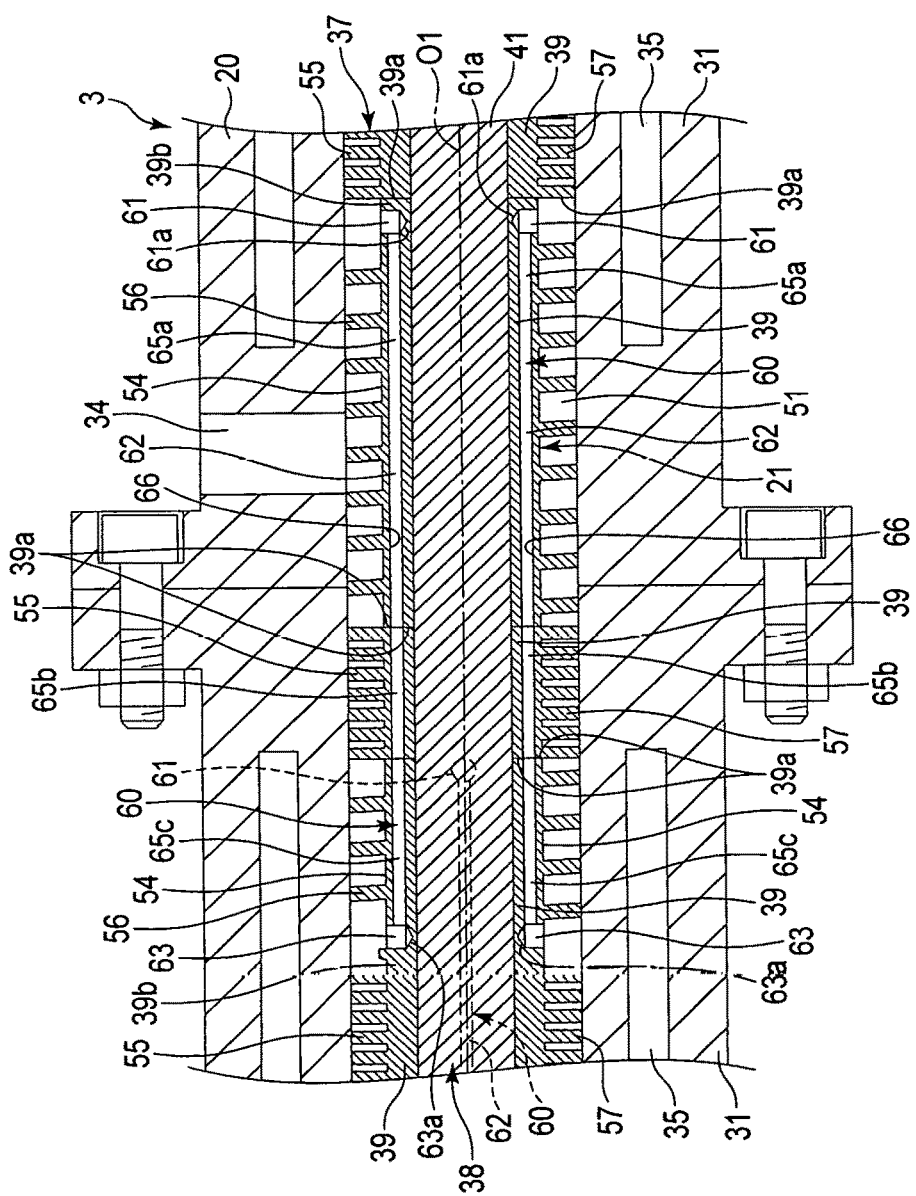
FIG. 10 is an enlarged cross-sectional view of the second extruder of the first embodiment, showing a passage formed through three cylinders adjacent along the axis of rotation.

Referring to FIGS. 6 and 10, supposing that one of the barrier portions 55 and two of the conveyances portions 54 sandwiching the one barrier portion 55 constitute one unit, each passage 60 is formed in three successive cylindrical members 39 corresponding to the one unit.

More specifically, the passages 60 are each defined by first to third passage elements 61, 62 and 63. The first passage element 61 may be referred to as the inlet of the passage 60. The first passage element 61 is formed in the outer peripheral surface of the cylindrical member 39 that corresponds to the conveyance portion 54 located closer to the proximal end of the screw body 37 than the barrier portion 55 unit by unit mentioned above. On the outer peripheral surface of the cylindrical member 39 corresponding to the conveyance portion 54, the open end of the first passage element 61 is located near the boundary of adjacent barrier portion 55 that is closer to the proximal end of the screw body 37 than the conveyance portion 54. Further, the open end of the first passage element 61 is deviated from flight 56.

In the embodiment, the first passage element 61 is formed by performing a machining process on the outer peripheral surface of the cylindrical member 39, using, for example, a drill. Therefore, the first passage element 61 is a hole having a circular cross section, and radially extends in the cylindrical member 39 from the outer peripheral surface of the same such that it intersects axis O1. The bottom 61a of the first passage element 61 provides a slope resulting from cutting the cylindrical member 39 in the shape of a cone by the tip of the drill.

The second passage element 62 may be referred to as a main passage portion in which raw materials circulate. The second passage element 62 extends in parallel with axis O1 of the screw body 37 in the three cylindrical members 39 corresponding to the conveyance portions 54 and the barrier portion 55. Therefore, the second passage element 62 extends along the axis of the screw body 37 without branching, and has a predetermined length.

As is best shown in FIG. 10, the second passage element 62 comprises a first portion 65a formed in one of the three cylindrical members 39 close to the proximal end of the screw body 37, a second portion 65b formed in the middle one of the three cylindrical members 39, and a third portion 65c formed in one of the three cylindrical members 39 close to the distal end of the screw body 37. The first portion 65a, the second portion 65b and the third portion 65c are arranged coaxial along the axis of the screw body 37.

The first portion 65a of the second passage element 62 extends through the cylindrical member 39 along the axis thereof, and opens to the end face 39a of the cylindrical member 39 close to the middle cylindrical member 39. The end of the first portion 65a opposite to the open end thereof is blocked by the end wall 39b of the cylindrical member 39. In the embodiment, the first portion 65a of the second passage element 62 is formed by performing a machining process on the end face 39a of the cylindrical member 39, using, for example, a drill. Therefore, the first portion 65a is defined as a hole having a circular cross section.

The second portion 65b of the second passage element 62 is formed by performing a machining process on the middle cylindrical member 39, using, for example, a drill. The second portion 65b extends through the middle cylindrical member 39 along the axis thereof, and opens to the opposite ends 39a of the middle cylindrical members 39. Therefore, the second portion 65b is defined as a hole having a circular cross section.

The third portion 65c of the second passage element 62 extends through the cylindrical member 39 along the axis thereof, and opens to the end face 39a of the cylindrical member 39 adjacent to the middle cylindrical member 39. The end of the third portion 65c opposite to the open end thereof is blockaded by the end wall 39b of the cylindrical member 39. In the embodiment, the third portion 65c of the second passage element 62 is formed by performing a machining process on the end face 39a of the cylindrical member 39, using, for example, a drill. Therefore, the third portion 65c is defined as a hole having a circular cross section.

As shown in FIGS. 6 and 10, the open end of the first portion 65a, the open end of the second portion 65b and the open end of the third portion 65c abut coaxially so that they communicate with each other when the three adjacent cylindrical members 39 are tightened along the axis of the rotating shaft 38.

The third passage element 65c may be referred to as the outlet of the passage 60. The third passage element 65c opens to the outer peripheral surface of the cylindrical members 39 corresponding to the conveyance portion 54 located closer to the distal end of the screw body 37 than the barrier portion 55 unit by unit mentioned above. On the outer peripheral surface of the cylindrical member 39 corresponding to the conveyance portion 54, the open end of the third passage element 63 is located near the boundary of adjacent barrier portion 55 that is closer to the distal end of the screw body 37 than the conveyance portion 54. Further, the open end of the third passage element 65c is deviated from flight 56.

Furthermore, in the embodiment, the third passage element 63 is formed by performing a machining process on the outer peripheral surface of the cylindrical member 39, using, for example, a drill. Therefore, the third passage element 63 is a hole having a circular cross section, and radially extends from the outer peripheral surface of the cylindrical member 39. The bottom 63a of the third passage element 63 provides a slope resulting from cutting the cylindrical member 39 in the shape of a cone by the tip of the drill.

The open ends of the first and third passage elements 61 and 63 are separate from each other along the axis of the screw body 37, with the two conveyance portions 54 and the one barrier portion 55 interposed therebetween. In other words, the shape of the surface of the screw body 37 varies between the open ends of the first and third passage elements 61 and 63.

As shown in FIG. 10, the end of the first portion 65a of the second passage element 62 opposite to the open end is connected to the first passage element 61 within the cylindrical member 39. The first passage element 61 and the first portion 65a of the second passage element 62 communicate with each other, with their circular cross sections maintained. Further, the end of the first portion 65a of the second passage element 62 is connected to the first passage element 61 in a position deviated from the conical bottom 61a of the first passage element 61. Alternatively, the first portion 65a of the second passage element 62 may be connected to the bottom 61a of the first passage element 61.

Accordingly, the first passage element 61 may be referred to as a first upright portion that is stood, radially with respect to the cylindrical member 39, from the end of the first portion 65a of the second passage element 62, such that it opens to the outer peripheral surface of the screw body 37.

The end of the third portion 65c of the second passage element 62 opposite to the open end is connected to the third passage element 63 within the cylindrical member 39. The passage element 63 and the third portion 65c of the second passage element 62 communicate with each other, with their circular cross sections maintained. Further, the end of the third portion 65c of the second passage element 62 is connected to the third passage element 63 in a position deviated from the conical bottom 63a of the third passage element 63. Alternatively, the third portion 65c of the second passage element 62 may be connected to the bottom 63a of the third passage element 63.

Accordingly, the third passage element 63 may be referred to as a second upright portion that is stood, radially with respect to the cylindrical member 39, from the end of the third portion 65c of the second passage element 62, such that it opens to the outer peripheral surface of the screw body 37.

In addition, in the middle portion of the screw body 37, the first passage element 61 used as the inlet of one passage 60 and the third passage element 63 used as the outlet of another adjacent passage 60 communicate with the conveyance passage 51 between the two adjacent barrier portions 55.

Also, since the passage 60 is provided in the cylindrical member 39, it is eccentric with respect to axis O1 of the screw body 37. Because of this, the passage 60 revolves around axis O1 when the screw body 37 rotates.

It is advisable to set the inner diameter of the hole constituting the second passage element 62 to, for example, not less than 1 mm and less than 6 mm, and preferably, to a range of from 1 mm or more to 5 mm or less. The inner diameter of the second passage 62 is smaller than that of the first passage element 61 as the inlet. The transverse section of the second passage element 62 is set much smaller than the cross section of the conveyance passage 51 assumed radially with respect to the cylindrical portion 33.

According to the embodiment, the cylindrical member 39 has a cylindrical wall 66 that defines the shape of the hole constituting the first to third passage elements 61, 62 and 63. The first to third passage elements 61, 62 and 63 surrounded by the wall 66 are hollow spaces for permitting only raw materials to pass therethrough, and contain no element for providing the screw body 37. The wall 66 revolves around axis O1, instead of rotating on the same, when the screw body 37 rotates.

In the embodiment, when the screw 21 is decomposed by removing the cylindrical members 39 from the rotating shaft 38, the cylindrical members 39 that constitute parts of flights 56, 57 and 58 may be referred to screw elements.

Also, in the embodiment, the screw body 37 of the screw 21 is formed by sequentially fitting the cylindrical members 39 as screw elements on the rotating shaft 38. This structure enables the conveyance portions 54 and the barrier portions 55 to be exchanged or recombined in accordance with, for example, the degree of kneading of raw materials, and facilitates the exchange/recombination works.

In addition, by tightening the cylindrical members 39 along the axis of the rotating shaft 38 to tightly attach the adjacent end faces 39a of the cylindrical members 39 to each other, the second passage element (main passage portion) 62 of the passage 60 is formed, whereby the first passage element (inlet) 61 tightly communicates with the third passage element (outlet) 63 via the second passage element 62.

By virtue of the above structure, in order to form the passage 60 in the screw body 37, it is sufficient to process the individual cylindrical member 39 that is much shorter than the entire length of the screw body 37. Thus, the forming and handling of the passage 60 become very easy.

In the continuous high-shearing processing apparatus 1 constructed as the above, the first extruder 2 preliminarily kneads a plurality of resin materials. The resultant resin melted by this kneading is a blended raw material having mobility, and is continuously supplied to the feed port 34 of the second extruder 3.

Figure 11:
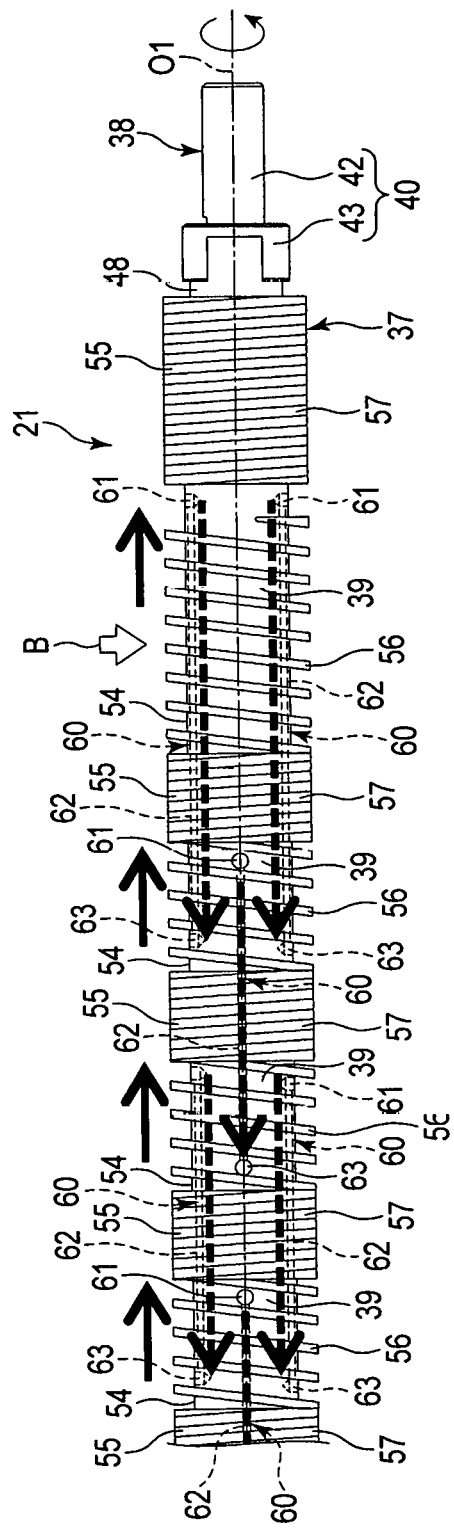
FIG. 11 is a side view showing the direction of flow of a raw material with respect to the screw in the first embodiment.

The blended raw material supplied to the second extruder 3 is guided to the outer peripheral surface of the conveyance portion 54 closest to the proximal end of the screw 21, as is indicated by arrow B of FIG. 11. Since the screw 21 rotates counterclockwise when viewed from the proximal end of the rotating shaft 38, flight 56 of the conveyance portion 54 conveys the raw material, guided thereto through the feed port 34, to the adjacent barrier portion 55 that is positioned close to the proximal end of the screw body 37, as indicated by the solid arrows of FIG. 11. That is, flight 56 returns the raw material, guided thereto through the feed port 34, to the proximal end of the screw body 37.

At this time, the raw material receives a shearing action caused by the difference in rotational speed between flight 56 revolving in the conveyance passage 51 and the inner peripheral surface of the cylindrical portion 33, and is also stirred by slightly twisted flight 56. As a result, the raw material is completely kneaded, whereby dispersion of the macromolecular component of the raw material advances.

The sheared raw material is conveyed along the conveyance passage 51, and reaches the boundary of the conveyance portion 54 and the barrier portion 55. Flight 57 of the barrier portion 55 is twisted clockwise to enable the raw material to be conveyed from the proximal end to the distal end of the screw body 37 when the screw 21 is rotated counterclockwise, and hence blocks the raw material fed by flight 56. In other words, when the screw 21 is rotated counterclockwise, flight 57 of the barrier portion 55 limits the flow of the raw material fed by flight 56, and prevents the same from passing through a clearance between the outer peripheral surface of the barrier portion 55 and the inner peripheral surface of the cylindrical portion 33.

This increases the pressure of the raw material at the boundary of the conveyance portion 54 and the barrier portion 55. More specifically, in FIG. 12, the degrees of filling of the raw material in positions corresponding to the conveyance portions 54 of the screw body 37 in the conveyance passage 51 are indicated by gradation. That is, the deeper the gradation, the higher the degree of filling. As is evident from FIG. 12, in the conveyance passage 51, the closer to the barrier portion 55, the higher the degree of filling of the raw material. Further, in a position closest to the barrier portion 55, the degree of filling of the material is 100%.

Thus, a material reservoir R having a degree of filling of 100% is formed in the position closest to the barrier portion 55. In the material reservoir R, the pressure of the raw material is increased since it is blocked by the barrier portion. The pressure-increased raw material flows from the first passage element 61 of the passage 60 to the second passage element 62 of the same as indicated by the dashed arrows in FIGS. 11 and 12.

The transverse section of the second passage element 62 is smaller than the transverse section of the conveyance passage 51 assumed radially with respect to the cylindrical portion 33. In other words, since the inner diameter of the second passage element 62 is much smaller than the outer diameter of the screw body 37, the raw material is drastically narrowed down when it is passed through the second passage element 62, whereby an extension action is exerted on the raw material.

In addition, since the cross section of the second passage element 62 is sufficiently smaller than that of the conveyance passage 51, the material reservoir R in front of the barrier portion 55 does not disappear although the raw material collected in the material reservoir R flows into the passage 60. Accordingly, even if the flow of the raw material fed into the barrier portion 55 by flight 56 is reduced to a certain degree, the reduction in the flow can be compensated for by the raw material collected in the material reservoir R. Thus, the raw material is always stably supplied to the passage 60.

Figure 12:
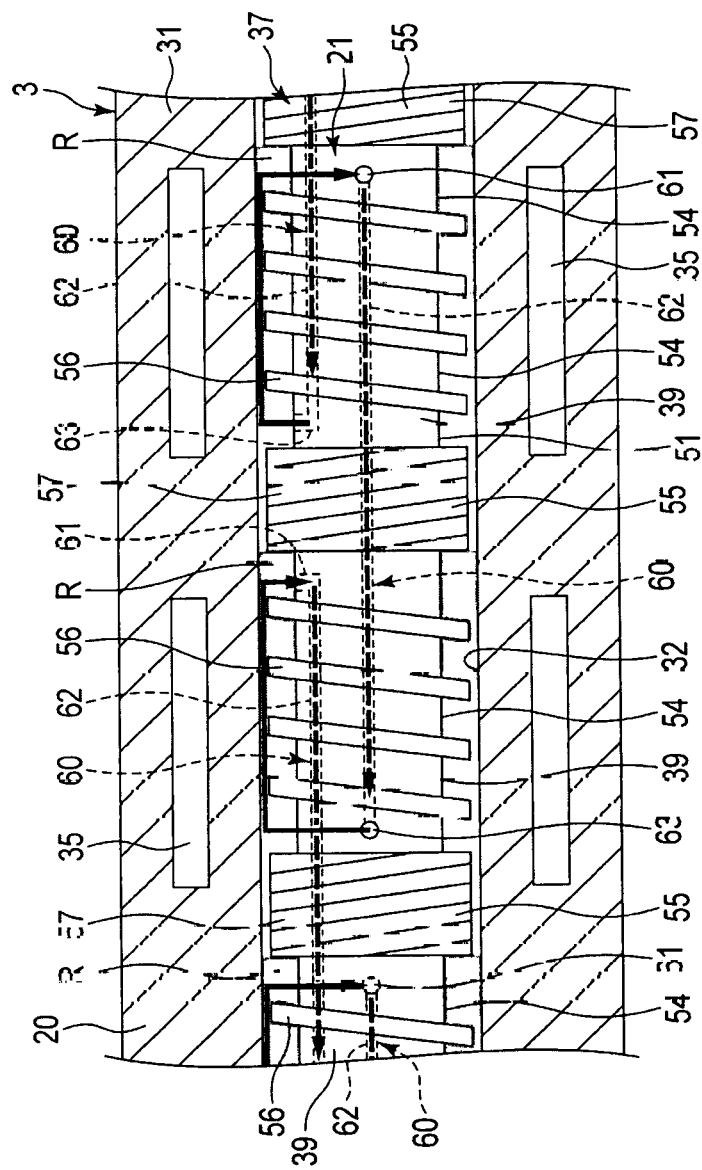
FIG. 12 is a schematic cross-sectional view showing the direction of flow of the raw material assumed in the first embodiment when the screw is rotated.

The raw material having passed through the second passage element 62 is returned to the conveyance portion 54 close to the distal end of the screw body 37 through the third passage element 63, as is indicated by the solid arrows in FIG. 12. The returned raw material is conveyed by flight 56 of the conveyance portion 54 toward the proximal end of the screw body 37, and is again subjected to a shearing action during this conveyance. The raw material subjected to the shearing action flows from the first passage element 61 of the passage 60 into the second passage element 62 of the same, and is again subjected to an extension action during passing through the second passage element 62.

In the embodiment, a plurality of conveyance portions 54 and a plurality of barrier portions 55 are alternately arranged along the axis of the screw body 37, and a plurality of passages 60 are arranged at intervals along the axis of the screw body 37. Accordingly, the raw material introduced through the feed port 34 into the screw body 37 is continuously conveyed from the proximal end of the screw body 37 to the distal end thereof, while it is being alternately subjected to the shearing action and the extension action, as is indicated by the arrows in FIGS. 10 and 11. As a result, the degree of kneading of the raw material is increased, thereby promoting dispersion of the macromolecule component of the raw material.

The second passage elements 62 of the passages 60 are open to the outer peripheral surface of the screw body 37 through the respective first passage elements 61 and the respective third passage elements 63. Therefore, in each passage 60, the raw material having flowed into the corresponding second passage element 62 through the corresponding first passage element 61 is always returned to the outer peripheral surface of the screw body 37 through the corresponding third passage element 63. That is, the respective raw materials in the plurality of passages 60 are not blended.

This structure prevents an excessive degree of kneading of the raw material, and enables appropriate kneading for realizing a desired degree of kneading.

The raw material having reached the distal end of the screw body 37, which is a sufficiently kneaded material, is guided to a clearance between the cylindrical portion 33 and the head portion 36 through the outlet 63 of the passage 60 closest to the head portion. Furthermore, the kneaded material is continuously supplied to the third extruder 4 from the discharge port 36a of the head portion 36.

In the third extruder 4, as already described, a gaseous substance and/or other volatile components of the kneaded material are continuously removed from the kneaded material. The kneaded material, from which the gaseous substance and/or other volatile components have been removed, are continuously discharged to the outside of the high-shearing processing apparatus 1 through the discharge port 28 of the head portion 27. The discharged kneaded material is immersed in cooling water stored in a tank. As a result, the kneaded material is cooled compulsorily to thereby obtain a desired resin molded item.

In the second extruder 3, the raw material supplied from the first extruder 2 is conveyed along the axis of the screw body 37, repeatedly reversed. During this conveyance, the raw material is repeatedly subjected to the shearing and extension actions. In other words, since the raw material does not circulate a number of times in the same position on the outer peripheral surface of the screw body 37, it can be continuously supplied from the second extruder 3 to the third extruder 4.

As a result, a sufficiently kneaded material can be continuously produced, whereby the efficiency of production of kneaded material can be remarkably enhanced, compared to the batch-type high-shearing molding apparatus.

Further, in the embodiment, since the resin preliminarily kneaded by the first extruder 2 is continuously supplied to the second extruder 3, the flow of the resin is prevented from being temporarily stopped in the first extruder 2. This prevents a change in the temperature, viscosity or phase of the resin due to accumulation of the preliminarily kneaded resin in the first extruder 2. Therefore, a raw material of uniform quality can always be supplied from the first extruder 2 to the second extruder 3.

In the first embodiment, the passage 60 for applying the extension action to the raw material extends along the axis of the screw body 37 in a position eccentric with respect to axis O1 of rotation of the screw body 37, and hence revolves around axis O1. In other words, the cylindrical wall 66 that defines the passage 60 revolves around axis O1, instead of rotating about axis O1.

Because of this, when the raw material passes through the passage 60, it is not significantly stirred although it receives a centrifugal force. The raw material passing through the passage 60 and returning to the conveyance portion 54 does not much receive the shearing action, but mainly receives the extension action.

Therefore, in the first embodiment, respective portions of the screw 21, in which the shearing action and the extension action are applied to the raw material, can be accurately set.

This is a very advantageous structure in view of the detection of the degree of kneading of raw material, and therefore can accurately control the degree of kneading. As a result, a kneaded material can be produced, which has a nanoscopic dispersion structure in which the macromolecular component of the raw material is nano-dispersed.

In addition, since all passages 60 are eccentric with respect to axis O1, the extension action can be uniformly applied to pieces of the raw material passing through the passages 60. That is, variation in conditions for kneading between the passages 60 can be overcome, thereby enabling uniform kneading.

Since in the first embodiment, the cylindrical members 39 have the same outer diameter D1, the conveyance passage 51 has a uniform annular transverse section along the entire length of the screw body 37. Accordingly, when the shearing and extension actions are repeatedly applied to the raw material through the conveyance passage 51, the passage 51 enables these actions to be sequentially and smoothly applied to the raw material, thereby realizing further uniform kneading.

Furthermore, in the first embodiment, the screw 21 is formed of the combination of the conveyance portions 54, the barrier portions 55 and the passages 60, and does not include a plasticization zone employed in the conventional uniaxial extruder. Thus, the second extruder 3 can be operated easily.

Modification of First Embodiment

Figure 13:
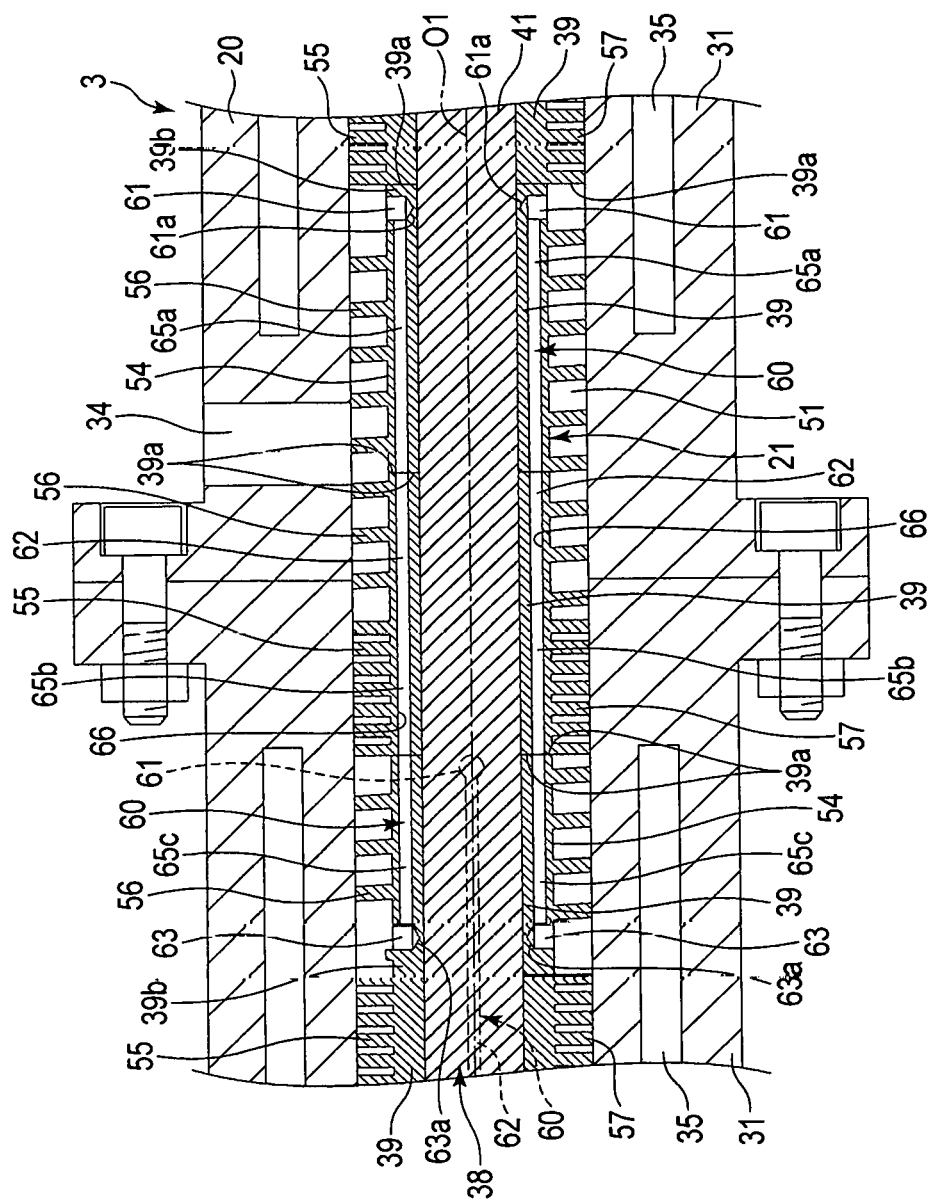
FIG. 13 is a schematic cross-sectional view showing a second extruder according to a modification of the first embodiment.
Figure 14:
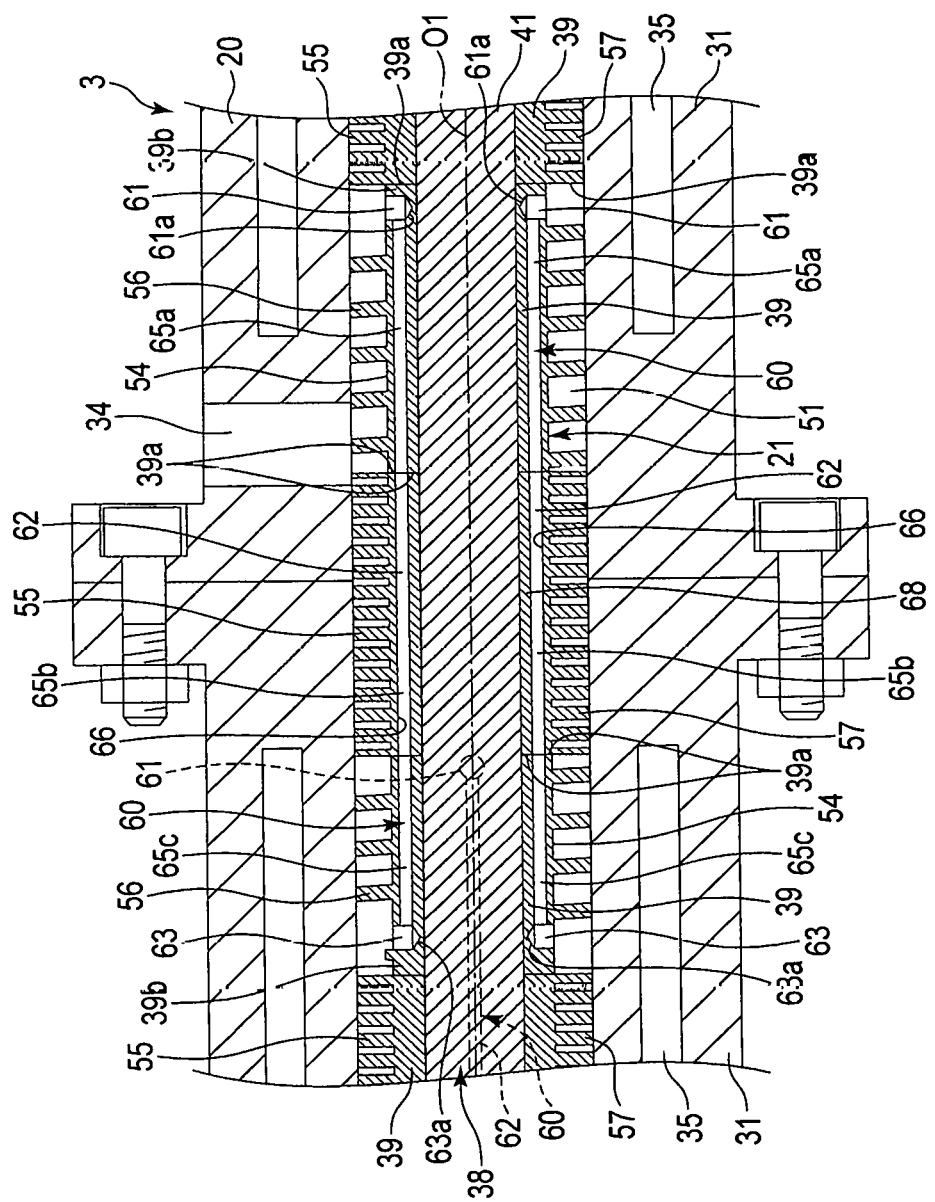
FIG. 14 is a schematic cross-sectional view of the second extruder according to the modification of the first embodiment, showing a state in which cylindrical members are changed.

FIGS. 13 and 14 show a modification of the first embodiment.

In the modification of FIG. 13, the flight 57 constituting the barrier portion 55, and a part of flight 56 constituting the conveyance portion 54, are continuously formed on the outer peripheral surface of the cylindrical member 39 provided with the second portion 65b of the second passage element 62. That is, the second portion 65b of the second passage element 62 is located in the cylindrical member 39 in which two types of flights 56 and 57 are formed.

In this structure, if a dedicated cylindrical member 68, in which flight 57 for the barrier portion 55 is formed on the entire outer peripheral surface as shown in FIG. 14, is prepared as the cylindrical member 39 including the second portion 65b of the second passage element 62, it can be replaced with the above-mentioned cylindrical member 39 including two types of flights 56 and 57.

Thereby, the ratio of an area occupied by flights 56 for the conveyance portions 54 to an area occupied by flights 57 for the barrier portions 55 can be varied in accordance with, for example, the degree of kneading of the raw material within the entire length of the three cylindrical members 39, 68 included in the passages 60.

Second Embodiment

Figure 15:
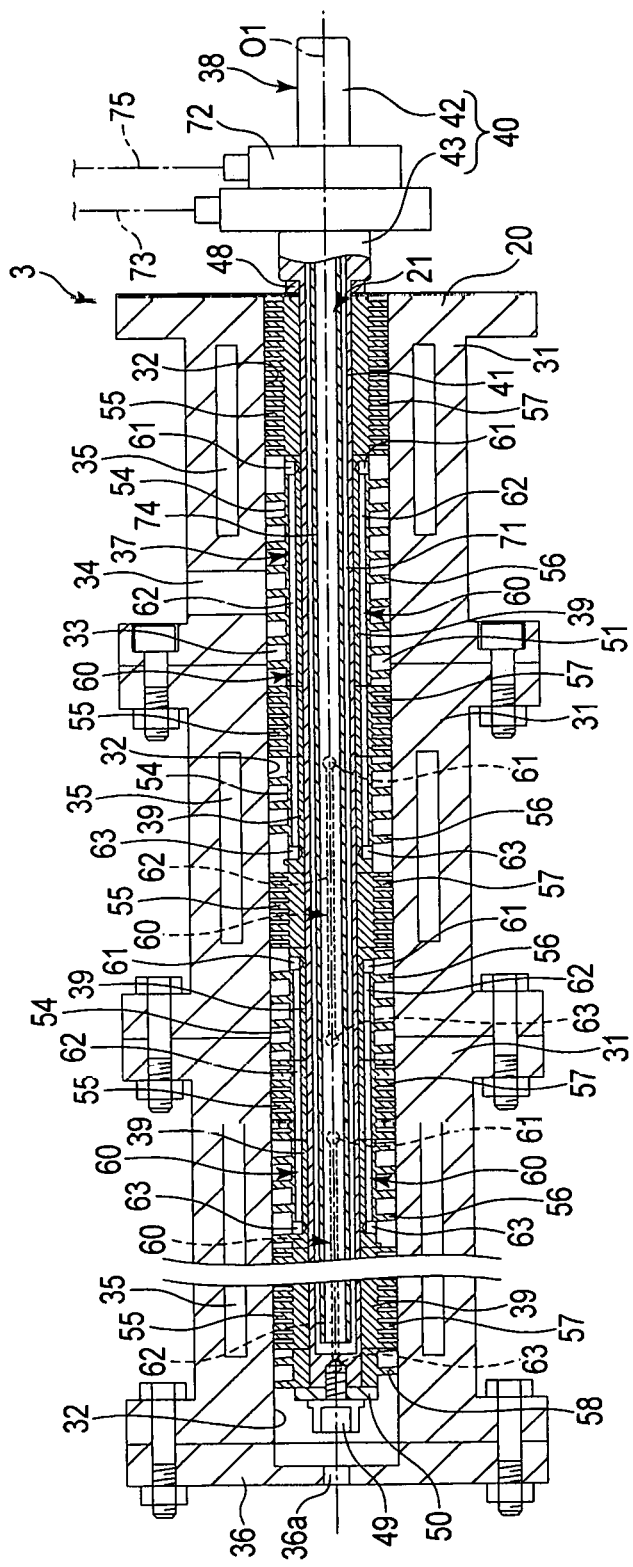
FIG. 15 is a cross-sectional view of a second extruder employed in a second embodiment.

FIG. 15 shows a second embodiment. The second embodiment differs from the first embodiment in matters associated with the rotating shaft 38 of the screw 21. The other structures of the second extruder 3 are basically the same as those of the first embodiment. Therefore, in the second embodiment, elements similar to those of the first embodiment are denoted by corresponding reference numbers, and no detailed description will be given thereof.

As shown in FIG. 15, a coolant passage 71 is formed inside the rotating shaft 38. The coolant passage 71 extends coaxially with the rotating shaft 38 along axis O1 of the same. One end of the coolant passage 71 is connected to outlet piping 73 through a rotary joint 72 at the joint portion 42. The other end of the coolant passage 71 is liquid-tightly blocked by the distal end of the rotating shaft 38.

A coolant introduction pipe 74 is coaxially inserted in the coolant passage 71. One end of the coolant introduction pipe 74 is connected to inlet piping 75 through the rotary joint 72. The other end of the coolant introduction pipe 74 is open to the inside of the coolant passage 71 near the other end of the coolant passage 71.

In the second embodiment, a coolant, such as water or oil, is fed from the inlet piping 75 into the coolant passage 71 through the rotary joint 72 and the coolant introduction pipe 74. The coolant fed into the coolant passage 71 is returned to the joint portion 42 of the rotating shaft 38 through a clearance between the inner peripheral surface of the coolant passage 71 and the outer peripheral surface of the coolant introduction pipe 74, and is returned to the outlet piping 73 through the rotary joint 72.

In the second embodiment, the coolant circulates along the axis of the rotating shaft 38, thereby cooling the screw body 37. For this reason, the temperature of the screw body 37 that touches raw materials can be adjusted appropriately, thereby preventing degradation of resin, changes in the viscosity of the resin, etc., caused by increases in the temperature of the raw materials.

Third Embodiment

FIGS. 16 to 22 show a third embodiment. The third embodiment differs from the first embodiment in the matter associated with the screw body 37 of the screw 21. The other structures of the second extruder 3 are basically the same as those of the first embodiment. Therefore, in the third embodiment, elements similar to those of the first embodiment are denoted by corresponding reference numbers, and no detailed description will be given thereof.

Figure 16:
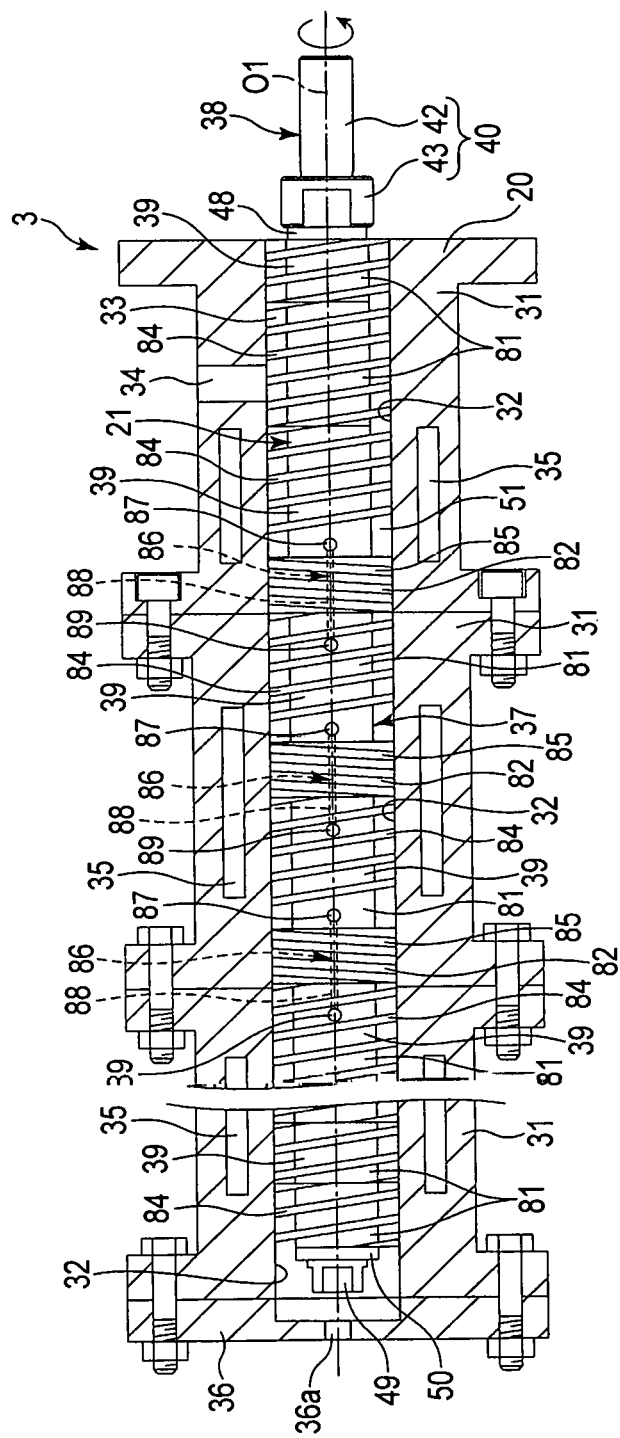
FIG. 16 is a cross-sectional view of a second extruder employed in a third embodiment.
Figure 17:
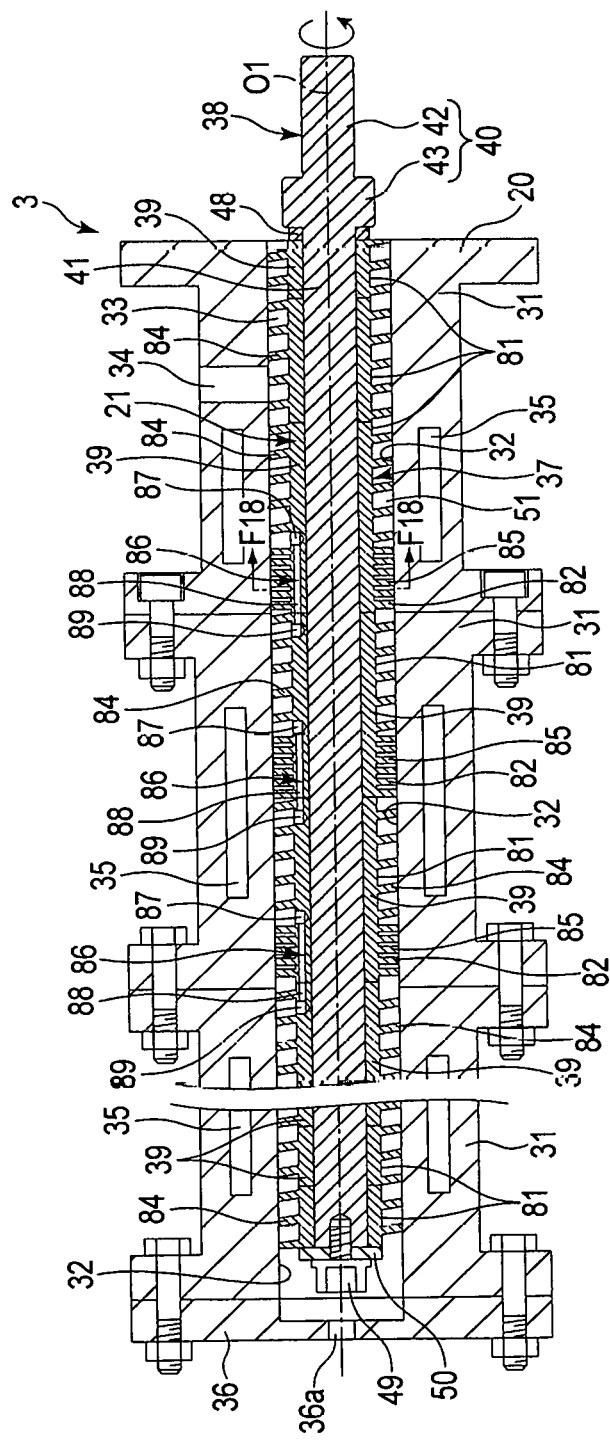
FIG. 17 is a cross-sectional view of the second extruder of the third embodiment, showing a barrel and a screw employed therein.
Figure 18:
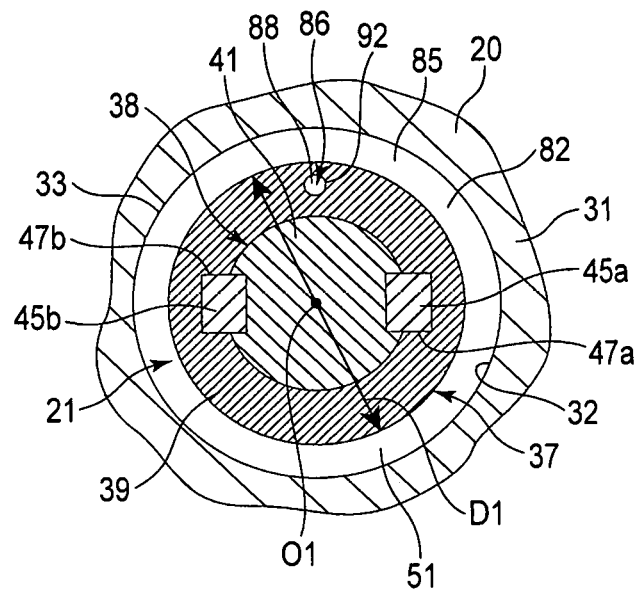
FIG. 18 is a cross-sectional view taken along line F18-F18 of FIG. 17.

As shown in FIGS. 16 and 17, a plurality of cylindrical members 39 constituting the screw body 37 are tightened between the first and second collars 48 and 50 along the axis of the second shaft portion 41, thereby attaching the end faces 39a of the adjacent cylindrical members 39 to each other without gaps.

The screw body 37 comprises a plurality of conveyance portions 81 for conveying raw materials, and a plurality of barrier portions 82 for restricting the flow of the raw materials. The conveyance portions 81 and the barrier portions 82 are alternately arranged along the axis of the screw body 37.

Figure 19:
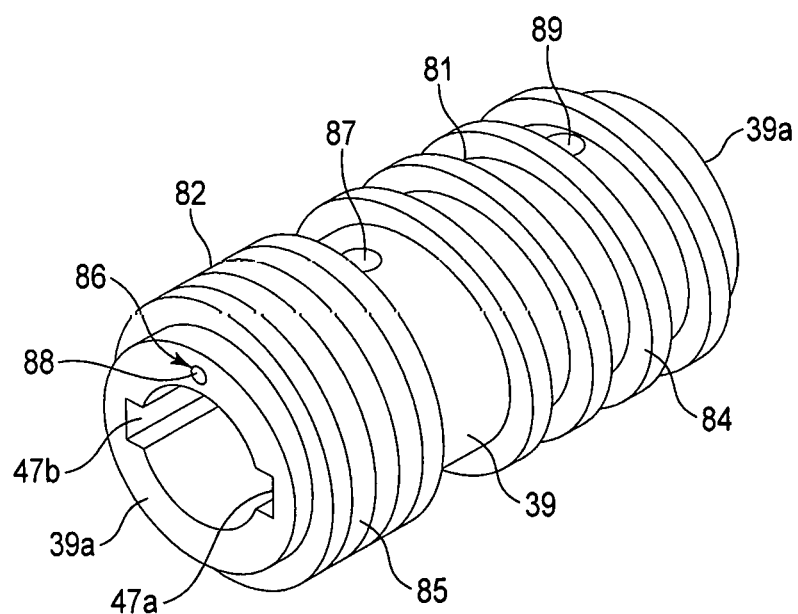
FIG. 19 is a perspective view showing a cylinder employed in the third embodiment.

As shown in FIGS. 17 and 19, the conveyance portions 81 have respective helical flights 84. Flights 84 project in the conveyance passage 51 from the outer peripheral surfaces of the cylindrical members 39, and the top portions of flights 84 constitute the outer peripheral surfaces of the conveyance portions 81. Flights 84 are twisted to cooperate to convey raw materials from the proximal end of the screw body 37 to the distal end of the same when the screw 21 is rotated counterclockwise. In other words, flights 84 are twisted clockwise like a right-handed screw. The length of the conveyance portion 81 along the axis of the screw body 37 is appropriately set in accordance with, for example, the sorts and/or the kneaded degrees of raw materials, and/or the quantity of a kneaded product per unit time. Furthermore, although the conveyance portions 81 are areas where flights 84 are formed at least on the outer peripheral surfaces of the cylindrical members 39, they are not limited to areas between the start and end points of flights 84.

In other words, areas of the outer peripheral surfaces of the cylindrical members 39, which are deviated from flights 84, may also be regarded the conveyance portions 81. Further, if a cylindrical spacer or collar is provided adjacent to a cylindrical member 39 having flight 84, it may also be included in the conveyance portion 81.

The barrier portions 82 have respective helical flights 85. Flights 85 project in the conveyance passage 51 from the outer peripheral surfaces of the cylindrical members 39, and the top portions of flights 85 constitute the outer peripheral surfaces of the barrier portions 82. Flights 85 are twisted to cooperate to convey raw materials from the distal end of the screw body 37 to the proximal end of the same when the screw 21 is rotated counterclockwise. In other words, flights 85 are twisted clockwise like a left-handed screw.

The pitch of flight 85 of the barrier portion 82 is the same as or smaller than that of flight 84 of the conveyance portion 81. Furthermore, a slight clearance is secured between the tops of flights 84 and 85 and the inner peripheral surface of the cylindrical portion 33 of the barrel 20.

The length of the barrier portion 82 along the axis of the screw body 37 is appropriately set in accordance with, for example, the sorts and/or the kneaded degrees of raw materials, and/or the quantity of a kneaded product per unit time. The barrier portion 82 functions to block the flow of the raw material fed from the conveyance portion 81. That is, the barrier portion 82 is located adjacent to the conveyance portion 81 on the downstream side with respect to the conveyance direction of raw materials, and is configured to prevent the raw material fed from the conveyance portion 81 from passing through the clearance between the top of flight 85 and the inner peripheral surface of the cylindrical portion 33.

Therefore, in the second extruder 3 of the embodiment, it is presupposed that the flow of raw materials is blocked at the barrier portion 82, whereby the raw materials do not pass through the clearance between the outer peripheral surface of the barrier portion 82 and the inner peripheral surface of the cylindrical portion 33.

According to the embodiment, at the proximal end of the screw body 37, a plurality of conveyance portions 81 are continuously arranged along the axis of the screw body 37. The feed port 34 of the barrel 20 faces the axial middle portion of one conveyance portion 81 at the proximal end of the screw body 37. Similarly, at the distal end of the screw body 37, a plurality of conveyance portions 81 are continuously arranged along the axis of the screw body 37.

As shown in FIGS. 17 and 19, in the middle portion of the screw body 37, flight 84 constituting the conveyance portion 81 and flight 85 constituting the barrier portion 82 are sequentially provided on the outer peripheral surface of a corresponding cylindrical member 39. That is, two sorts of flights 84 and 85 are axially sequentially arranged on one cylindrical member 39. Flight 85 constituting the barrier portion 82 is located closer to the distal end of the screw body 37 than flight 84 constituting the conveyance portion 81.

Also, in the embodiment, flights 84 and 85 project the conveyance passage 51 from a plurality of cylindrical members 39 having the same outer diameter D1. Thus, the outer peripheral surfaces of the cylindrical members 39 define the root diameter of the screw 21. The root diameter of the screw 21 is constant over the entire length of the screw 21.

As shown in FIGS. 16 to 20, the screw body 37 has a plurality of passages 86 extending along the axis of the screw body 37. The passages 86 are arranged on a line parallel to the axis of the screw body 37. Each passage 86 is formed in two successive cylindrical members 39 on which two sorts of flights 84 and 85 are formed. More specifically, each passage 86 is defined by the first to third passage elements 87, 88 and 89.

The first passage element 87 may be referred to as the inlet of the passage 86. The first passage element 87 opens to the outer peripheral surface of one of the two successive cylindrical members 39. The open end of the first passage element 87 is positioned in the boundary of the conveyance portion 81 and the barrier portion 82, and is deviated from flight 84 of the conveyance portion 81 and flight 85 of the barrier portion 82.

Furthermore, in the embodiment, the first passage element 87 is formed by performing a machining process on the outer peripheral surface of one of the cylindrical members 39, using, for example, a drill. Therefore, the first passage element 87 is a hole having a circular cross section, and radially extends in the one cylindrical member 39 from the outer peripheral surface of the same such that it intersects axis O1. The bottom 87a of the first passage element 87 provides a slope resulting from cutting the cylindrical member 39 in the shape of a cone by the tip of the drill.

The second passage element 88 may be referred to as a main passage portion in which raw materials circulate. The second passage element 88 extends in the two successive cylindrical members 39 in parallel with axis O1 of the screw body 37. Therefore, the second passage element 88 extends along the axis of the screw body 37 without branching, and has a predetermined length.

Figure 20:
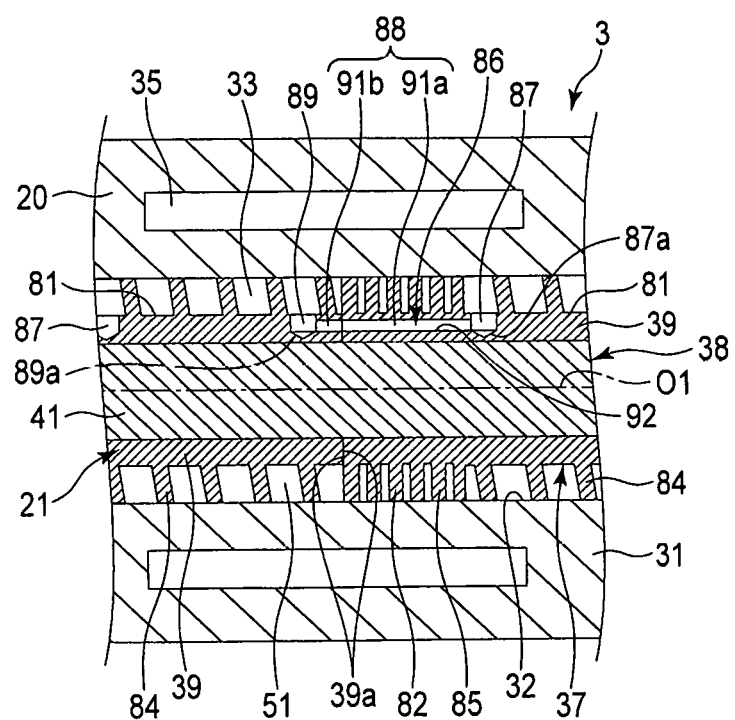
FIG. 20 is an enlarged cross-sectional view showing the structure of a passage formed in the main body of the screw in the third embodiment.

As best shown in FIG. 20, the second passage element 88 comprises a first portion 91a formed in one of the cylindrical members 39, and a second portion 91b second formed in the other cylindrical member 39.

The first portion 91a of the second passage element 88 extends along the axis of the one cylindrical member 39, and opens to the end face 39a of the one cylindrical member 39 close to the other cylindrical member 39. The end of the first portion 91a opposite to the open end thereof is blocked by the axial middle portion of the one cylindrical member 39. According to the embodiment, the first portion 91a of the second passage element 88 is formed by performing a machining process on the one cylindrical member 39 from the end face 39a side thereof, using, for example, a drill. Therefore, the first portion 91a is defined as a hole having a circular cross section.

The second portion 91b of the second passage element 88 extends along the axis of the above-mentioned other cylindrical member 39, and opens to the end face 39a of the other cylindrical member 39 close to the above-mentioned one cylindrical member 39. The end of the second portion 91b opposite to the open end thereof is blocked in the one other cylindrical member 39.

In the embodiment, the second portion 91b of the second passage element 88 is formed by performing a machining process on the other cylindrical member 39 from the end face 39a side thereof, using, for example, a drill. Therefore, the second portion 91b is defined as a hole having a circular cross section, like the first portion 91a.

As best shown in FIGS. 17 and 20, the open end of the first portion 91a and the open end of the second portion 91b are made to coaxially abut so that they communicate with each other when the adjacent two cylindrical members 39 are tightened along the axis of the rotating shaft 38.

The third passage element 89 may be referred to as the outlet of the passage 86. The third passage element 89 opens to the outer peripheral surface of the other of the adjacent two cylindrical members 39. The open end of the third passage element 89 is located at the upstream end of the conveyance portion 81, and is deviated from flight 84 of the conveyance portion 81. As a result, the open ends of the first and third passage elements 87 and 89 are separate from each other along the axis of the screw body 37, with the barrier portion 82 interposed therebetween.

Furthermore, in the embodiment, the third passage element 89 is formed by performing a machining process on the outer peripheral surface of the other cylindrical members 39, using, for example, a drill. Therefore, the third passage element 89 is a hole having a circular cross section, and radially extends in the other cylindrical member 39 from the outer peripheral surface of the same such that it intersects axis O1. The bottom 89a of the third passage element 89 provides a slope resulting from cutting the cylindrical member 39 in the shape of a cone by the tip of the drill.

As shown in FIG. 20, the end of the first portion 91a of the second passage element 88 opposite to the open end thereof is coupled to the first passage element 87 inside the one cylindrical member 39. The first passage element 87 and the first portion 91a of the second passage element 88 communicate with each other with their circular cross sections maintained. Further, the first portion 91a of the second passage element 88 is coupled to the first passage element 87 in a position deviated from the conical bottom 87a of the first passage element 87. However, the first portion 91a of the second passage element 88 is coupled to the bottom 87a of the first passage element 87.

In view of the above, the first passage element 87 may also be referred to as a first standing portion that is stood from an end of the first portion 91a of the second passage element 88 radially with respect to the cylindrical member 39 and opens to the outer peripheral surface of the screw body 37.

The end of the second portion 91b of the second passage element 88 opposite to the open end thereof is coupled to the third passage element 89 inside the other cylindrical member 39. The third passage element 89 and the second portion 91b of the second passage element 88 communicate with each other, with their circular cross sections maintained. Further, the second portion 91b of the second passage element 88 is coupled to the third passage element 89 in a position deviated from the conical bottom 89a of the third passage element 89. However, the second portion 91b of the second passage element 88 is coupled to the bottom 89a of the third passage element 89.

Therefore, the third passage element 89 may also be referred to as a second standing portion that is stood from an end of the second portion 91b of the second passage element 88 radially with respect to the cylindrical member 39 and opens to the outer peripheral surface of the screw body 37.

According to the embodiment, since the passage 86 is provided inside the cylindrical member 39, the passage 86 is eccentric with respect to axis O1 of the screw body 37. Therefore, the passage 86 revolves around axis O1 when the screw body 37 rotates.

The inner diameter of the hole constituting the second passage element 88 is set to, for example, 1 mm or more and less than 6 mm, and more preferably, to 1 mm or more and 5 mm or less. Furthermore, the inner diameter of the second passage element 88 is smaller than that of the first passage element 87 used as the inlet. The transverse section of the second passage element 88 is set much smaller than the cross section of the conveyance passage 51 assumed radially with respect to the cylindrical portion 33.

According to the embodiment, the cylindrical members 39 has a cylindrical walls 92 that defines the holes constituting the first to third passage elements 87, 88 and 89. The first to third passage elements 87, 88 and 89 surrounded by the walls 92 are hollow spaces that permit only raw materials to pass therethrough, and contain no elements that constitute the screw body 37. Moreover, the wall 92 revolves around axis O1, instead of rotating about axis O1, when the screw body 37 rotates.

Further, in the embodiment, when a plurality of cylindrical members 39 provided with flights 84 and 85 are removed from the rotating shaft 38, each cylindrical member 39, which is provided with at least the first passage element 87 or the third passage element 89, and with the second passage element 88 formed therein, may also be referred to as a screw element.

In the above structure, the raw material obtained by blending by the first extruder 2 and having mobility is continuously fed to the conveyance passage 51 through the feed port 34 of the second extruder 3. The raw material fed to the second extruder 3 is guided onto the outer peripheral surface of one of the conveyance portions 81 located at the proximal end of the screw body 37, as is indicated by arrow C in FIG. 21. Since the screw 21 is rotated counterclockwise when viewed from the proximal end of the rotating shaft 38, flight 84 of the conveyance portion 81 conveys, toward the distal end of the screen body 37, the raw material introduced through the feed port 34, as is indicated by the solid arrows in FIG. 21.

At this time, a shearing action caused by the difference in speed between flights 84 rotating in the conveyance passage 51, and the inner peripheral surface of the cylindrical portion 33 is exerted on the raw material, and the raw material is stirred by slight twisting of flights 84. As a result, the raw material is completely kneaded, whereby dispersion of the macromolecular component of the raw material advances.

The raw material having been subjected to the shearing action moves along the conveyance passage 51 and reaches the boundary of the conveyance portion 81 and the barrier portion 82. Since flight 85 of the barrier portion 82 is configured to convey the raw material from the distal end side of the screw body 37 to the proximal end side of the same when the screw 21 rotates counterclockwise, it blocks the raw material fed by flight 84.

That is, when the screw 21 is rotated counterclockwise, flight 85 of the barrier portion 82 limits the flow of the raw material fed by flight 84 of the conveyance portion 81, and prevents the raw material from passing through the clearance between the outer peripheral surface of the barrier portion 82, and the inner peripheral surface of the cylindrical portion 33.

Figure 22:
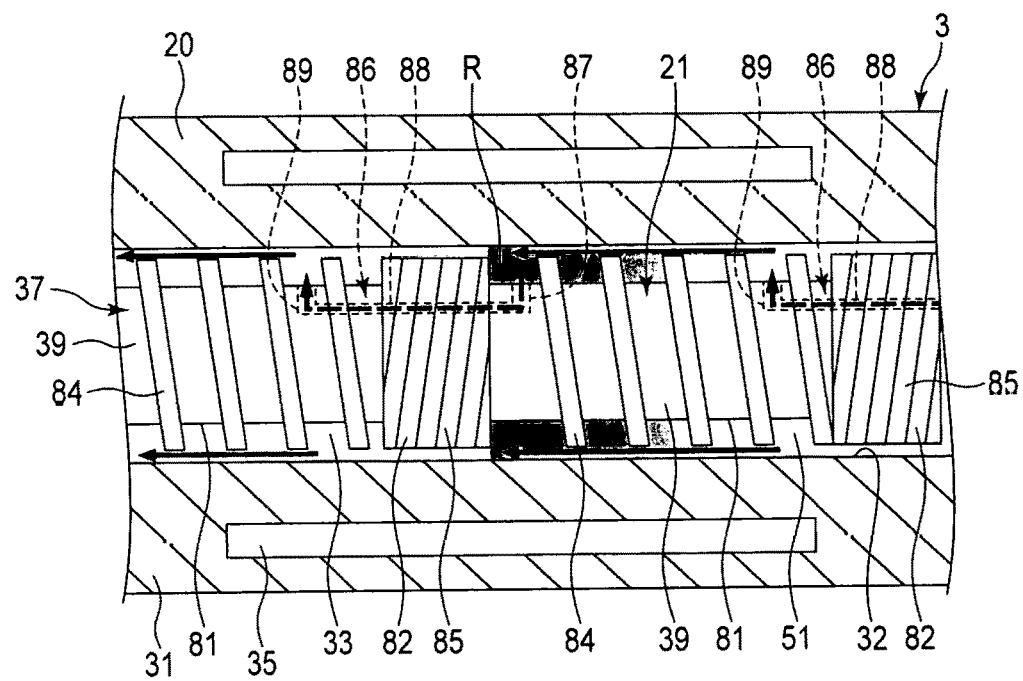
FIG. 22 is a schematic cross-sectional view of the second extruder of the third embodiment, showing the direction of flow of the raw material assumed when the screw is rotated.

As a result, the pressure of the raw material increases at the boundary of the conveyance portion 81 and the barrier portion 82. More specifically, FIG. 22 shows, using gradation, the filling ratio of the raw material in a portion of the conveyance passage 51 corresponding to the conveyance portion 81, so that the deeper the color, the higher the filling ratio of the raw material. As is clear from FIG. 22, in the conveyance passage 51, the filling ratio of the raw material is higher in a position closer to the barrier portion 82, and is 100% in front of the barrier portion 82.

Thus, a material reservoir R having a material filling ratio of 100% is formed in front of the barrier portion 82. In the material reservoir R, the pressure of the raw material is increased since the flow of the raw material is blocked. The pressurized raw material flows into the second passage element 88 through the first passage element 87 of the passage 86 that opens to the boundary of the conveyance portion 81 and the barrier portion 82, as is indicated by the dashed arrows in FIGS. 21 and 22. The raw material having flowing into the second passage element 88 circulates through the second passage element 88 from the proximal end side of the screw body 37 to the distal end side of the same.

The transverse section of the second passage element 88 is smaller than that of the conveyance passage 51, which is parallel to the transverse section of the cylindrical portion 33. In other words, since the inner diameter of the second passage element 88 is much smaller than the outer diameter of the screw body 37, the raw material is significantly restricted and extended when it passes through the second passage element 88.

In addition, since the cross section of the second passage element 88 is sufficiently smaller than that of the conveyance passage 51, the material reservoir R in front of the barrier portion 82 does not disappear, although the raw material collected in the material reservoir R flows into the passage 86. Accordingly, even if, for example, the flow rate of the raw material fed into the barrier portion 82 by flight 84 of the conveyance portion 81 is decreased to a certain degree, the decreased portion can be compensated for by the raw material collected in the material reservoir R. Thus, the raw material can be reliably supplied to the passage 86.

As indicated by the dashed arrows in FIG. 22, the raw material having passed through the second passage element 88 of the passage 86 is returned from the third passage element 89 to the outer peripheral surfaces of the cylindrical members 39 of the adjacent conveyance portions 81. The returned raw material is conveyed toward the distal end of the screw body 37 by flights 84 of the adjacent conveyance portions 81, and again receives a shearing action during this conveyance. The raw material received the shearing action flows into the second passage element 88 through the first passage element 87 of a subsequent passage 86, and again receives an extension action during passing through the second passage element 88.

In the axially middle portion of the screw body 37, a plurality of conveyance portions 81 and a plurality of barrier portions 82 are alternately arranged, and a plurality of passages 86 are arranged at intervals along the axis of the screw body 37. This structure enables the raw material fed into the screw body 37 through the feed port 34 to be conveyed continuously from the proximal end side of the screw body 37 to the distal end side of the same, with the shearing and extension actions alternately repeated. As a result, the degree of kneading of the raw material is enhanced, and the dispersion of the macromolecular component of the raw material is promoted.

The second passage elements 88 of the passages 86 are open to the outer peripheral surface of the screw body 37 through the respective first and third passage elements 87 and 89. Accordingly, in each passage 86, the raw material flowing into the second passage element 88 through the first passage element 87 always returns to the outer peripheral surface of the screw body 37 through the third passage element 89. That is, raw material blending does not occur among the passages 86.

By virtue of the above structure, the raw material is prevented from being excessively kneaded, thereby realizing appropriate kneading for a desired degree of kneading.

In the third embodiment, the passage 86 for applying an extension action to the raw material extends along the axis of the screw body 37 in a position eccentric with respect to axis O1 as the rotation axis of the screw body 37. Therefore, the passage 86 revolves around axis O1. In other words, the cylindrical wall surface 92, which defines the passage 86, revolves around axis O1, instead of rotation about axis O1.

Because of the above, the raw material is prevented from being excessively stirred in the passage 86 when it passes through the passage 86. Therefore, the raw material passing through the passage 86 is hard to receive a shearing action, and is mainly subjected to an extension action after returning to the outer peripheral surface of the conveyance portion 81 through the passage 86.

That is, also in the screw 21 of the third embodiment, respective portions in which the shearing action and the extension action are applied to the raw material can be accurately set, thereby providing same advantages as those of the first embodiment.

Modification of Third Embodiment

Figure 23:
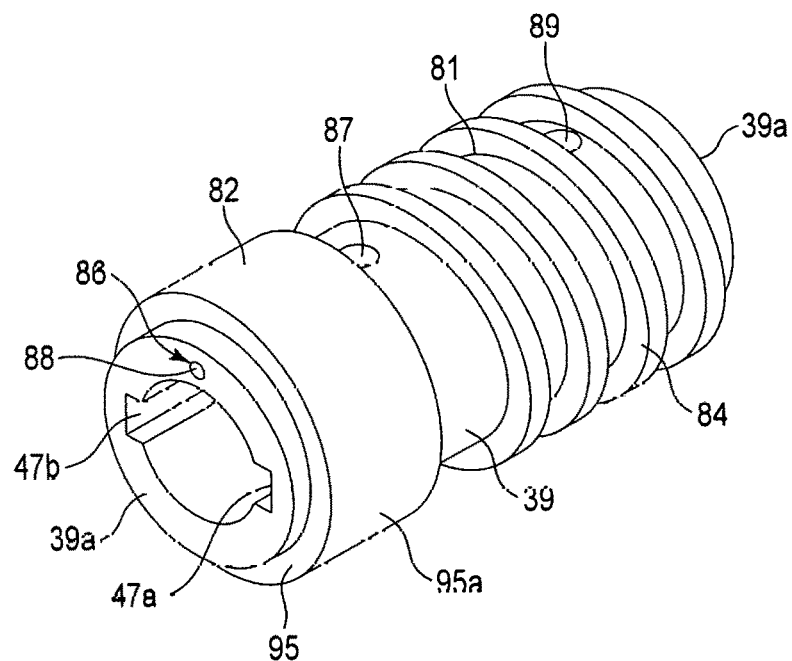
FIG. 23 is a perspective view of a barrier according to a modification of the third embodiment.

FIG. 23 shows a modification of the third embodiment. This modification differs from the third embodiment in the structure of the barrier portion 82 of the screw body 37. As shown in FIG. 23, the barrier portion 82 comprises a cylindrical large-diameter portion 95 extending along the axis of the screw body 37. The large-diameter portion 95 has an outer peripheral surface 95a continuous along the periphery of the screw body 37, and has the same length as the barrier portion 82 along the axis of the screw body 37. It is desirably that the outer peripheral surface 95a of the large-diameter portion 95 has a smooth surface free from recesses and/or cutouts.

Fourth Embodiment

FIGS. 24 to 31 show a fourth embodiment. The fourth embodiment differs from the first embodiment in the matter associated with the screw body 37 of the screw 21. The other structures of the second extruder 3 are similar to those of the first embodiment. Therefore, the same elements as those of the first embodiment are denoted by corresponding reference numbers, and no detailed description will be given thereof.

Figure 24:
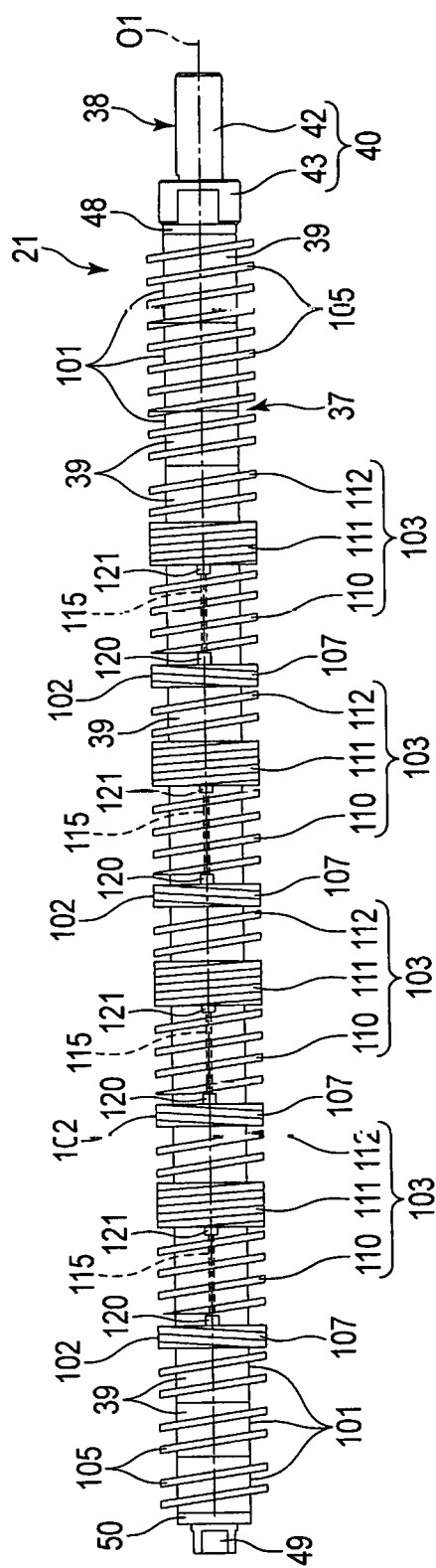
FIG. 24 is a side view of a screw employed in a fourth embodiment.
Figure 25:
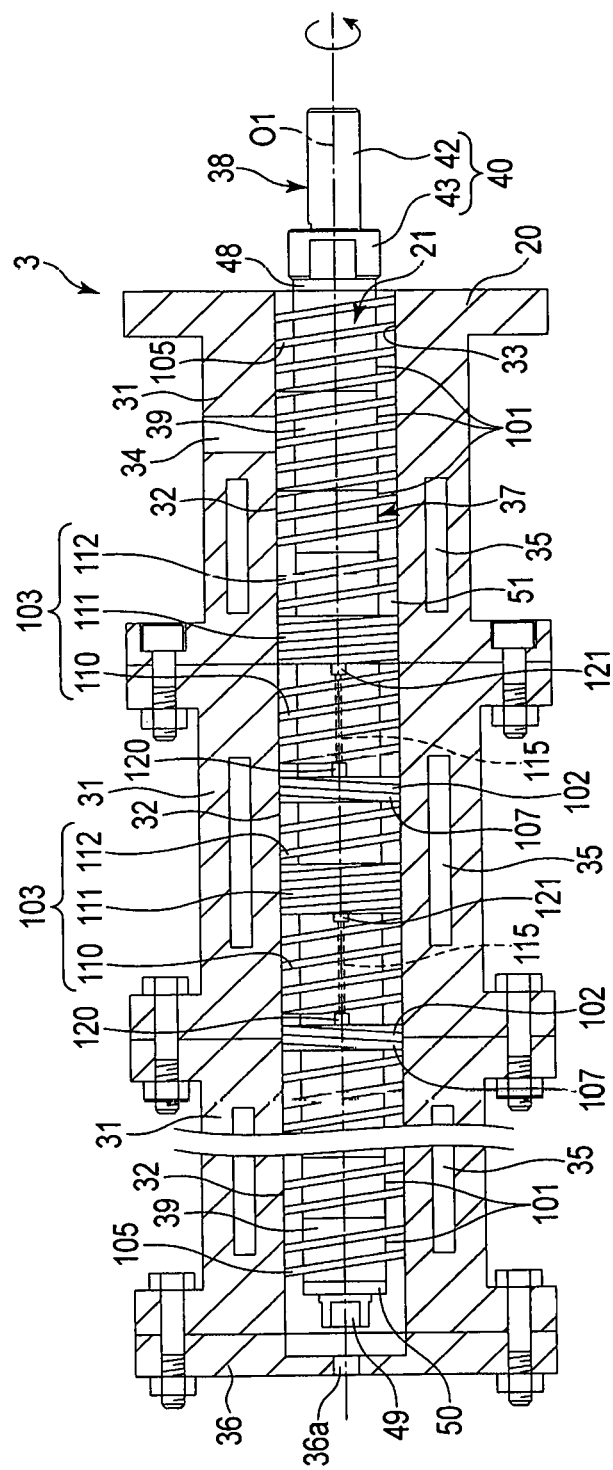
FIG. 25 is a cross-sectional view of a second extruder employed in the fourth embodiment.
Figure 26:
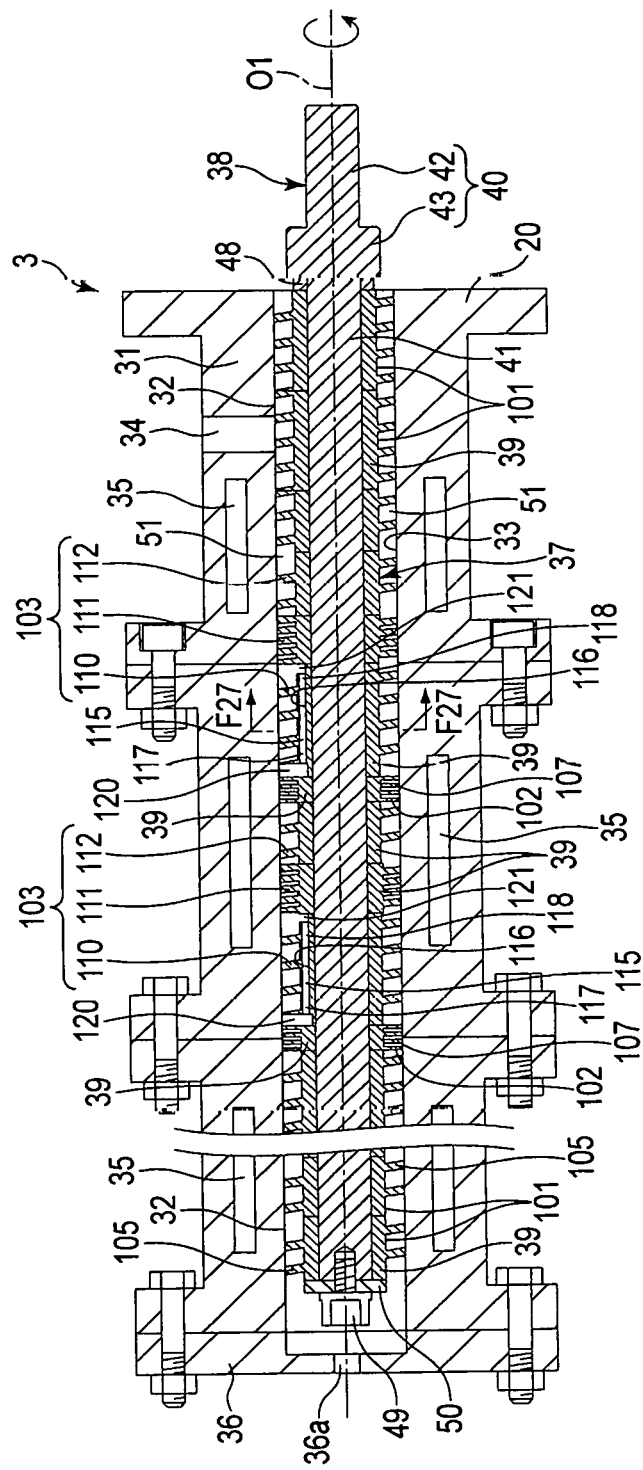
FIG. 26 is a cross-sectional view of the second extruder of the fourth embodiment, showing a barrel and a screw employed therein.
Figure 28:
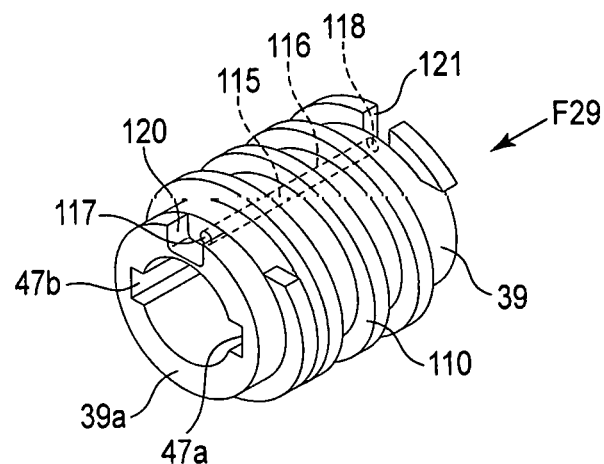
FIG. 28 is a perspective view of a cylinder employed in the fourth embodiment.
Figure 29:
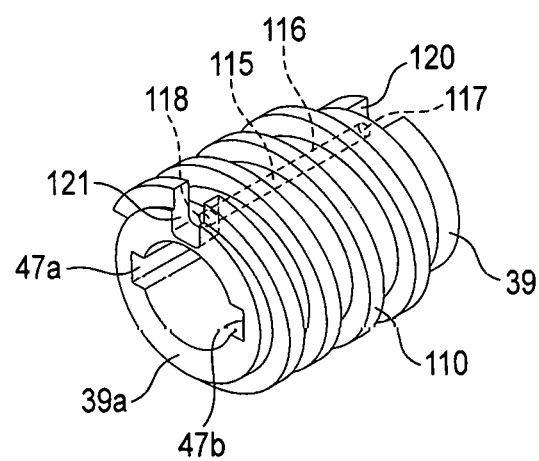
FIG. 29 is a perspective view of the cylinder, viewed from a direction indicated by arrow F29 of FIG. 28.

As shown in FIGS. 24 to 26, a plurality of cylindrical members 39 that constitute the screw body 37 is tightened between the first collar 48 and the second collar 50 along the axis of the second shaft portion 41, with the end faces 39a of the adjacent cylindrical members 39 attached to each other without gaps.

The screw body 37 has a plurality of conveyance portions 101 for conveying the raw materials, a plurality of barrier portions 102 for limiting the flow of the raw materials, and a plurality of circulation portions 103 for temporarily circulating the raw materials. The conveyance portions 101, the barrier portions 102 and the circulation portions 103 are arranged along the axis of the screw body 37.

The conveyance portions 101 have respective helical flights 105. Flights 105 project in the conveyance passage 51 from the outer peripheral surfaces of the cylindrical members 39, and the top portions of flights 105 constitute the outer peripheral surfaces of the conveyance portions 101. Fights 105 are twisted to cooperate to convey raw materials from the proximal end of the screw body 37 to the distal end of the same when the screw 21 rotates counterclockwise. In other words, flights 105 are twisted clockwise like a right-handed screw.

In the embodiment, a plurality of conveyance portions 101 are continuously arranged on both the proximal end and the distal end of the screw body 37. The feed port 34 of the barrel 20 faces the axial middle portion of one of the conveyance portions 101 at the proximal end of the screw body 37.

The length of the conveyance portion 101 along the axis of the screw body 37 is appropriately set in accordance with, for example, the sorts and/or the kneaded degrees of raw materials, and/or the quantity of a kneaded product per unit time. Furthermore, although the conveyance portions 101 are areas where flights 105 are formed at least on the outer peripheral surfaces of the cylindrical members 39, they are not limited to areas between the start and end points of flights 105.

In other words, an area of the outer peripheral surface of the cylindrical member 39 deviated from flight 105 may be also regarded as the conveyance portion 101. Further, if a cylindrical spacer or collar is located adjacent to the cylindrical member 39 having flight 105, it may also be included in the conveyance portion 101.

The barrier portions 102 are arranged at intervals along the axis of the screw body 37 in the middle portion of the same located between its proximal and distal ends. The barrier portions 102 have respective helical flights 107. Flights 107 project in the conveyance passage 51 from the outer peripheral surfaces of the cylindrical members 39, and the top portions of flights 107 constitute the outer peripheral surfaces of the barrier portions 102. Fights 107 are twisted to cooperate to convey raw materials from the distal end of the screw body 37 to the proximal end of the same when the screw 21 rotates counterclockwise. In other words, flights 107 are twisted counterclockwise like a left-handed screw. The pitch of flight 107 of each barrier portion 102 is the same as or smaller than that of flight 105 of each conveyance portion 101.

Furthermore, the entire length of the barrier portion 102 along the axis of the screw body 37 is shorter than that of the conveyance portion 101. In addition, the clearance between the top portion of flight 107 and the inner peripheral surface of the cylindrical portion 33 of the barrel 20 is slightly smaller than that between the top portion of flight 105 and the inner peripheral surfaces of the cylindrical portion 33 of the barrel 20.

The length of the barrier portion 102 along the axis of the screw body 37 is appropriately set in accordance with, for example, the sorts and/or the kneaded degrees of raw materials, and/or the quantity of a kneaded product per unit time. The barrier portion 102 functions to block the flow of raw materials sent from the conveyance portion 101. That is, the barrier portion 102 is configured to prevent the raw materials conveyed by the conveyance portion 101 from passing through a clearance between the top of flight 107 and the inner peripheral surface of the cylindrical portion 33.

Each circulation portion 103 is adjacent to a corresponding barrier portion 102 in a position close to the proximal end of the rotating shaft 38, and comprises first, second and third helical flights 110, 111 and 112. In the embodiment, the first, second and third flights 110, 111 and 112 are arranged in this order in a direction of from the barrier portion 102 to the proximal end of the screw body 37.

The first, second and third flights 110, 111 and 112 project in the conveyance passage 51 from the outer peripheral surfaces of the cylindrical members 39, and the top portions of the flights 110, 111 and 112 constitute the outer peripheral surface of the circulation portion 103.

The first, second and third fights 110, 111 and 112 are continuously arranged along the axis of the screw body 37, and are twisted to cooperate to convey raw materials from the proximal end of the screw body 37 to the distal end of the same when the screw 21 rotates counterclockwise. In other words, the first, second and third fights 110, 111 and 112 are twisted clockwise like a right-handed screw.

The pitch of the first flight 110 is the same as or greater than that of flight 107 of the adjacent barrier portion 102. The pitch of the second flight 111 is smaller than that of the first flight 110. The pitch of the third flight 112 is greater than that of the second flight 111. A slight clearance is secured between the top portions of the first, second and third flights 110, 111 and 112 and the inner peripheral surfaces of the cylindrical portion 33 of the barrel 20.

In the screw 21 of the embodiment, various types of flights 105, 107, 110, 111 and 112 all project in the conveyance passage 51 from the outer peripheral surfaces of the cylindrical members 39 having the same outer diameter D1. Thus, the outer peripheral surfaces of the cylindrical members 39 define the root diameter of the screw 21. The root diameter of the screw 21 is kept constant over the entire length of the screw 21.

As shown in FIGS. 24 to 26, the screw body 37 has a plurality of passages 115 that extend along the axis of the screw body 37. The passages 115 are formed inside the cylindrical members 39 at respective positions corresponding to the first flights 110, and are arranged at intervals along the axis of the screw body 37.

The passages 115 extend in parallel with axis O1 of the screw body 37. In other words, the passages 115 extend along the axis of the cylindrical members 39, without branching, and have predetermined length.

Also, since the passages 115 are provided in the cylindrical members 39, they are eccentric with respect to axis O1 of the screw body 37. Because of this, the passages 115 revolve around axis O1 when the screw body 37 rotates.

As shown in FIG. 27, the passages 115 are defined as, for example, a hole having a circular cross section. The inner diameter of the hole constituting the passage 115 is set to, for example, 1 mm or more and less than 6 mm, and more preferably, to 1 mm or more and 5 mm or less. Further, the transverse section of the passage 115 is set much smaller than the cross section of the conveyance passage 51 assumed radially with respect to the cylindrical portion 33.

Furthermore, the cylindrical member 39, in which the first flight 110 is formed, has a cylindrical wall surface 116 that defines the hole. The passage 115 surrounded by the wall surface 116 is a hollow space that permits only raw materials to pass therethrough, and does not contain any element that constitutes the screw body 37. Also, the wall surface 116 revolves around axis O1, instead of rotating about axis O1, when the screw body 37 rotates about axis O1.

Figure 31:
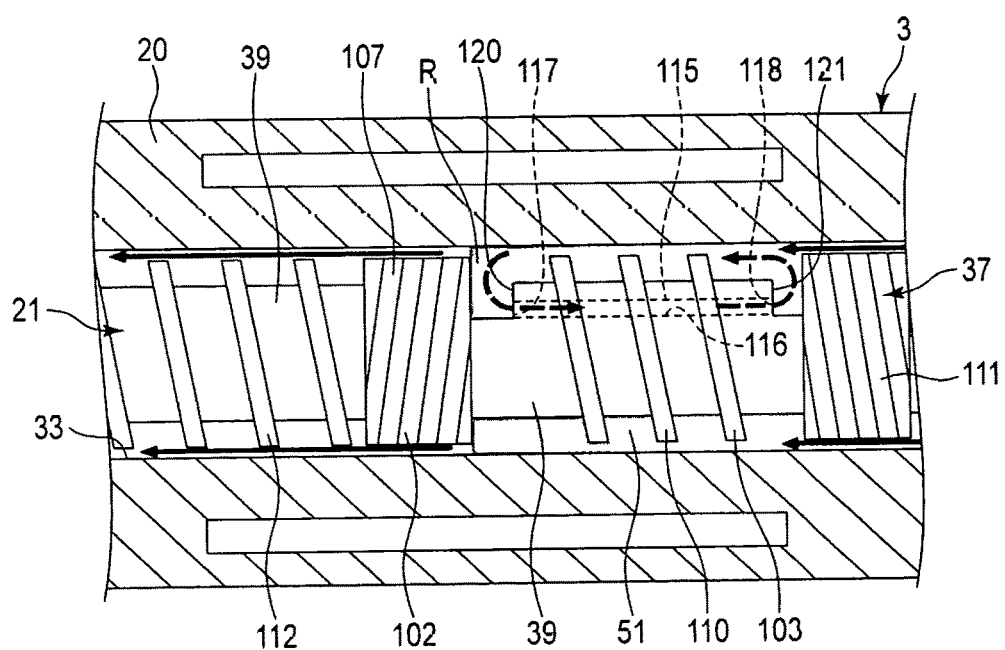
FIG. 31 is a schematic cross-sectional view of the second extruder of the fourth embodiment, showing the direction of the raw material assumed when the screw is rotated.

As shown in FIGS. 26 and 31, the passage 115 has an inlet 117 and an outlet 118. The inlet 117 is located in front of the barrier portion 102 that is adjacent to the circulation portion 103 in a position close to the distal end of the rotating shaft 38. In the embodiment, a slot 120 open to the outer peripheral surface of the cylindrical member 39 is formed in an end face of the cylindrical member 39 that constitutes the circulation portion 103, and the inlet 117 is formed in the inner surface of the slot 120.

The outlet 118 is located at the boundary of the first and second flights 110 and 111. In the embodiment, a slot 121 open to the outer peripheral surface of the cylindrical member 39 is formed in the end face of the cylindrical member 39 which constitutes the circulation portion 103, and the outlet 118 is formed in the inner surface of the slot 121. Thus, the inlet 117 and the outlet 118 are separate from each other along the axis of the screw body 37 in a position corresponding to the first flight 110.

In the embodiment, it is desirable to set the open area of the inlet 117 open to the inner surface of the slot 120, and the open area of the outlet 118 open to the inner surface of the slot 121, to a value equal to or greater than the transverse section of the passage 115.

Furthermore, when a plurality of cylindrical members 39 are removed from the rotating shaft 38 to thereby decompose the screw 21, each cylindrical member 39, which includes the first flight 110 and the passage 115 are formed, may be referred to as a screw element. Similarly, when a plurality of cylindrical members 39 provided with other flights 105, 107, 111 and 112 are removed from the rotating shaft 38, each cylindrical member 39 removed from the rotating shaft 38 may be referred to as a screw element.

In the above structure, the raw material blended by the first extruder 2 and having mobility is continuously supplied to the conveyance passage 51 through the feed port 34 of the second extruder 3. The raw material fed to the second extruder 3 is guided onto the outer peripheral surface of one of the conveyance portions 101 located at the proximal end of the screw body 37, as is indicated by arrow D of FIG. 30.

Since the screw 21 is counterclockwise rotated when viewed from the proximal end of the rotating shaft 38, flight 105 of the conveyance portion 101 conveys, to the adjacent circulation portion 103, the raw material introduced through the feed port 34. The first, second and third flights 110, 111 and 112 of the circulation portion 103 continuously convey the raw material toward the distal end of the screw body 37 as indicated by the solid arrows in FIGS. 30 and 31.

At this time, a shearing action caused by the difference in speed between the flights 105, 110, 111 and 112 rotated in the conveyance passage 51 and the inner peripheral surface of the cylindrical portion 33 is exerted on the raw material, and the raw material is also stirred by the slight twisting of the flights 105, 110, 111 and 112. As a result, the raw material is completely kneaded, thereby promoting dispersion of the macromolecular component of the raw material.

The sheared raw material is conveyed along the conveyance passage 51, and reaches the boundary of the barrier portion 102 and the circulation portion 103. Flight 107 of the barrier portion 102 conveys the raw material from the distal end side of the screw body 37 to the proximal end side of the same when the screw 21 is rotated counterclockwise, and hence blocks the raw material fed by the first flight 110.

That is, when the screw 21 is rotated counterclockwise, flight 107 of the barrier portion 102 limits the flow of the raw material fed by the first flight 110 of the circulation portion 103, and prevents the raw material from passing through a clearance between the outer peripheral surface of the barrier portion 102 and the inner peripheral surface of the cylindrical portion 33.

As a result, the pressure of the raw material increases at the boundary of the circulation portion 103 and the barrier portion 102. More specifically, in FIG. 31, the degrees of filling of the raw material in positions in the conveyance passage 51 corresponding to the conveyance portions 115 is indicated by gradation. That is, the deeper the gradation, the higher the degree of filling. As is evident from FIG. 31, in the conveyance passage 51, the closer to the barrier portion 102 from the second flight 111 of the circulation portion 103, the higher the degree of filling of the raw material. Further, in a position closest to the barrier portion 102, the degree of filling of the raw material is 100%.

Thus, a material reservoir R having a degree of filling of 100% is formed in the position closest to the barrier portion 102. In the material reservoir R, the pressure of the raw material is increased since it is blocked by the barrier portion 102. The pressure-increased raw material is introduced through the slot 120 into the inlet 117 located in front of the barrier portion 102, and flows into the passage 115 through the inlet 117, as is indicated by the dashed arrows in FIGS. 30 and 31. The raw material having flowed into the passage 115 circulates from the distal end side of the screw body 37 to the proximal end side of the same. The direction of the flow of the raw material in the passage 115 is opposite to that of the material fed by the flights 105, 110, 111 and 112.

The transverse section of the passage 115 is smaller than the cross section of the conveyance passage 51 assumed radially with respect to the cylindrical portion 33. In other words, since the inner diameter of the passage 115 is much smaller than the outer diameter of the screw body 37, the raw material is drastically restricted when it passes through the passage 115, whereby an extension action is exerted on the raw material.

In addition, since the cross section of the passage 115 is sufficiently smaller than that of the conveyance passage 51, the material reservoir R in front of the barrier portion 102 does not disappear, although the raw material collected in the material reservoir R flows into the passage 115. Accordingly, even if, for example, the flow rate of the raw material fed into the barrier portion 102 by the first flight 110 is decreased to a certain degree, the decreased portion can be compensated for by the raw material collected in the material reservoir R. Thus, the raw material can be reliably supplied to the passage 115.

The raw material having passed through the passage 115 is returned through the outlet 118 and the slot 121 to the outer peripheral surface of the cylindrical member 39 that constitutes the circulation portion 103. The returned raw material is conveyed toward the distal end of the screw body 37 by the first flight 110, and is subjected to a shearing action during this conveyance.

In the embodiment, part of the raw material conveyed by the first flight 110 towards the barrier portion 102 is again guided to the passage 115 through the inlet 117, and the circulation of the material is temporarily repeated in the circulation portion 103. The remaining raw material conveyed towards the barrier portion 102 passes through the clearance between the top portion of flight 107 of the barrier portion 102 and the inner peripheral surface of the cylindrical portion 33. This raw material is conveyed toward the distal end of the screw body 37 by the first, second and third flights 110, 111 and 112 of the adjacent circulation portion 103.

The passages 115 open to the outer peripheral surfaces of the respective cylindrical members 39 through the respective inlets 117 and outlets 118. Accordingly, in each passage 115, the raw material having flowed through the corresponding inlet 117 is always returned to the outer peripheral surface of the cylindrical member 39 of the corresponding circulation portion 103 through the corresponding outlet 118. That is, raw material blending will not occur among the passages 115.

This can avoid excessive kneading of raw materials, with the result that appropriate kneading for providing a desired degree of kneading can be achieved.

In the screw 21 of the embodiment, a plurality of barrier portions 102 and a plurality of circulation portions 103 are alternately arranged along the axis of the screw body 37. Further, a plurality of passages 115 are arranged at intervals along the axis of the screw body 37 in positions corresponding to the first flights 110 of the plurality of circulation portions 103. By virtue of this structure, the raw material fed to the screw body 37 through the feed port 34 is conveyed continuously from the proximal end of the screw body 37 to the distal end of the same, while it is being alternately subjected to the shearing action and the extension action. As a result, the degree of kneading of the raw material is increased to thereby promote the dispersion of the macromolecular component of the raw material.

In the fourth embodiment, the passage 115 for applying the extension action to the raw material extends along the axis of the screw body 37 in a position eccentric with respect to axis O1 of rotation of the screw body 37, and hence revolves around axis O1. In other words, the cylindrical wall surface 116 that defines the passage 115 revolves around axis O1, instead of rotating about axis O1.

Because of this, when the raw material passes through the passage 115, it is free from the shearing force due to rotation of the wall surface 116 on its own axis, although it receives a centrifugal force. Thus, the raw material passing through the passage 115 and returning to the outer peripheral surface of the cylindrical member 39 of the circulation portion 103 mainly receives the extension action.

Therefore, also in the fourth embodiment, respective portions of the screw 21, in which the shearing action and the extension action are applied to the raw material, can be accurately set, thereby acquiring the same advantage as that of the first embodiment.

Modification 1 of Fourth Embodiment

Figure 32:
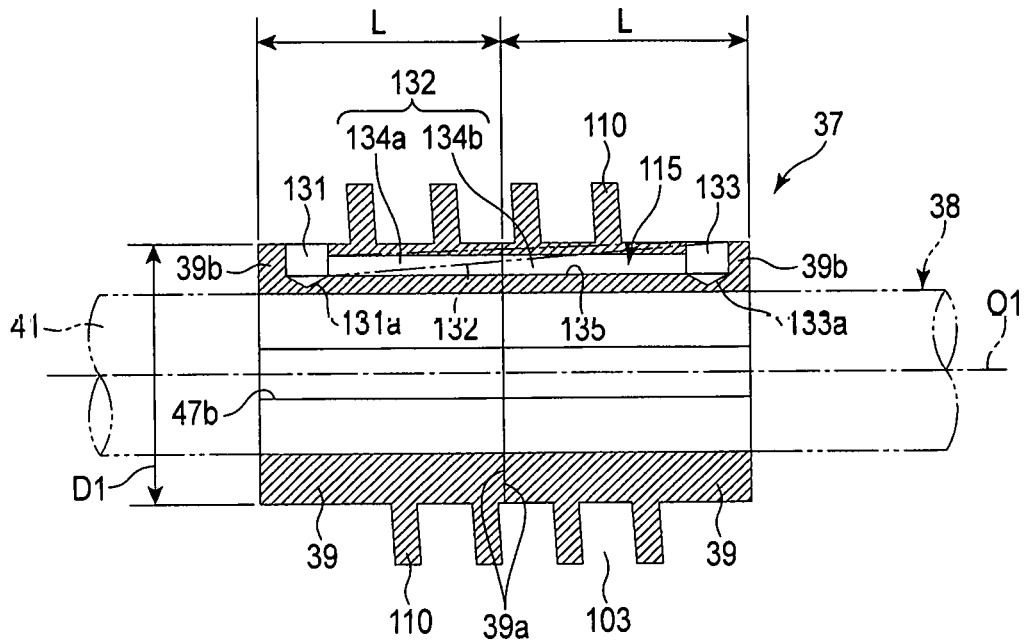
FIG. 32 is a schematic cross-sectional view showing a screw body according to modification 1 of the fourth embodiment.

FIG. 32 shows modification 1 of the fourth embodiment.

Modification 1 differs from the fourth embodiment in the matter associated with the passage 115 for applying an extension action to raw materials. The other structures are basically similar to those of the fourth embodiment.

As shown in FIG. 32, the first flight 110 of the circulation portion 103 is formed on the rotating shaft 38, covering two adjacent cylindrical members 39. The two cylindrical members 39 with the first flight 110 provided thereon have the same length L along the axis of the rotating shaft 38.

In addition, the passage 115 for applying the extension action to raw materials is continuously formed in the two cylindrical members 39 with the first flight 110 formed thereon. More specifically, the passage 115 is defined by first, second and third passage elements 131, 132 and 133.

The first passage element 131 may be referred to as the inlet of the passage 115. The first passage element 131 opens to the outer peripheral surface of one of the two adjacent cylindrical members 39 close to the barrier portion 102. The open end of the first passage element 131 is deviated from the first flight 110 and located in front of the adjacent barrier portion 102.

Furthermore, the first passage element 131 is formed by performing a machining process on the outer peripheral surface of one of the cylindrical members 39, using, for example, a drill. Therefore, the first passage element 131 is a hole having a circular cross section, and radially extends in the one cylindrical member 39 from the outer peripheral surface of the same such that it intersects axis O1. The bottom 131a of the first passage element 131 provides a slope resulting from cutting the one cylindrical member 39 in the shape of a cone by the tip of the drill.

The second passage element 132 may be referred to as a main passage portion in which raw materials circulate. As shown in FIG. 32, the second passage element 132 extends in the adjacent two cylindrical members 39 in parallel with axis O1 of the screw body 37. Therefore, the second passage element 132 extends along the axis of the screw body 37 without branching, and has a predetermined length.

The second passage element 132 comprises a first portion 134a formed in the one cylindrical member 39, and a second portion 134b formed in the other cylindrical member 39. The first portion 134a of the second passage element 132 extends along the axis of the one cylindrical member 39, and opens to the end face 39a of the one cylindrical member 39 close to the other cylindrical member 39. The end of the first portion 134a opposite to the open end thereof is blocked by the end wall 39b of the one cylindrical member 39.

In this modification, the first portion 134a of the second passage element 132 is formed by performing a machining process on the one cylindrical member 39 from the end face 39a side of the same, using, for example, a drill. Therefore, the first portion 134a is defined as a hole having a circular cross section.

The second portion 134b of the second passage element 132 extends along the axis of the other cylindrical member 39, and opens to the end face 39a of the other cylindrical member 39 close to the one cylindrical member 39. The end of the second portion 134b opposite to the open end thereof is blocked by the end wall 39b of the other cylindrical member 39.

In this modification, the second portion 134b of the second passage element 132 is formed by performing a machining process on the other cylindrical member 39 from the end face 39a side of the same, using, for example, a drill. Therefore, the second portion 134b is defined as a hole having a circular cross section, like the first portion 134a.

Furthermore, the open end of the first portion 134a and the open end of the second portion 134b are made to coaxially abut so that they communicate with each other when the adjacent two cylindrical members 39 are tightened along the axis of the rotating shaft 38.

The third passage element 133 may be referred to as the outlet of the passage 115. The third passage element 133 opens to the outer peripheral surface of the other cylindrical member 39 included in the two adjacent cylindrical members 39. The open end of the third passage element 133 is deviated from the first flight 110, and located in front of the second flight 111 of the circulation portion 103. Therefore, the first and third passage elements 131 and 133 are separate from each other along the axis of the screw body 37.

In the modification, the third passage element 133 is formed by performing a machining process on the outer peripheral surface of the other cylindrical members 39, using, for example, a drill. Therefore, the third passage element 133 is a hole having a circular cross section, and radially extends in the other cylindrical member 39 from the outer peripheral surface of the same. The bottom 133a of the third passage element 133 provides a slope resulting from cutting the other cylindrical member 39 in the shape of a cone by the tip of the drill.

As shown in FIG. 32, the end of the first portion 134a of the second passage element 132 opposite to the open end thereof is connected to the first passage element 131 in the one cylindrical member 39. The first passage element 131 and the first portion 134a of the second passage element 132 communicate with each other, with their circular cross sections maintained. Further, the first portion 134a of the second passage element 132 is connected to the first passage element 131 in a position deviated from the conical bottom 131a of the first passage element 131.

Accordingly, the first passage element 131 may be referred to as a first upright portion that is stood, radially with respect to the cylindrical member 39, from the end of the first portion 134a of the second passage element 132, such that it opens to the outer peripheral surface of the screw body 37.

The end of the second portion 134b of the second passage element 132 opposite to the open end thereof is connected to the third passage element 133 in the other cylindrical member 39. The third passage element 133 and the second portion 134b of the second passage element 132 communicate with each other, with their circular cross sections maintained. Further, the second portion 134b of the second passage element 132 is connected to the third passage element 133 in a position deviated from the conical bottom 133a of the third passage element 133.

Accordingly, the third passage element 133 may be referred to as a second upright portion that is stood, radially with respect to the cylindrical member 39, from the end of the second portion 134b of the second passage element 132, such that it opens to the outer peripheral surface of the screw body 37.

It is advisable to set the inner diameter of the hole constituting the second passage element 132 to, for example, not less than 1 mm and less than 6 mm, and preferably, to a range of from 1 mm or more to 5 mm or less. The inner diameter of the second passage 132 is smaller than that of the first passage element 131 as the inlet. The transverse section of the second passage element 132 is set much smaller than the cross section of the conveyance passage 51 assumed radially with respect to the cylindrical portion 33.

Further, the cylindrical members 39 have a cylindrical wall surfaces that defines the holes constituting the first, second and third passage elements 131, 132 and 133. The first, second and third passage elements 131, 132 and 133 defined by the wall surfaces 135 are hollow spaces that permit only raw materials to pass therethrough, and do not contain any element that constitutes the screw body 37. Also, the wall surface 135 revolves around axis O1, instead of rotating about axis O1, when the screw body 37 rotates about axis O1.

Also when raw materials pass through the above-constructed passage 115, they are free from a shearing force although they receive a centrifugal force. Thus, modification 1 can provide the same advantage as the fourth embodiment.

It is not always necessary to form the second passage element 132 of the passage 115 in parallel with axis O1 of the screw body 37. For example, the second passage element 132 may be inclined with respect to axis O1 as indicated by the two-dot chain line in FIG. 32, such that the end of the second passage element 132 away from the first passage element 131 directly opens to the outer peripheral surface of the cylindrical member 39.

This structure can omit the third passage element 133 as the outlet of the raw materials, thereby simplifying the shape of the passage 115.

Modification 2 of Fourth Embodiment

Figure 33:
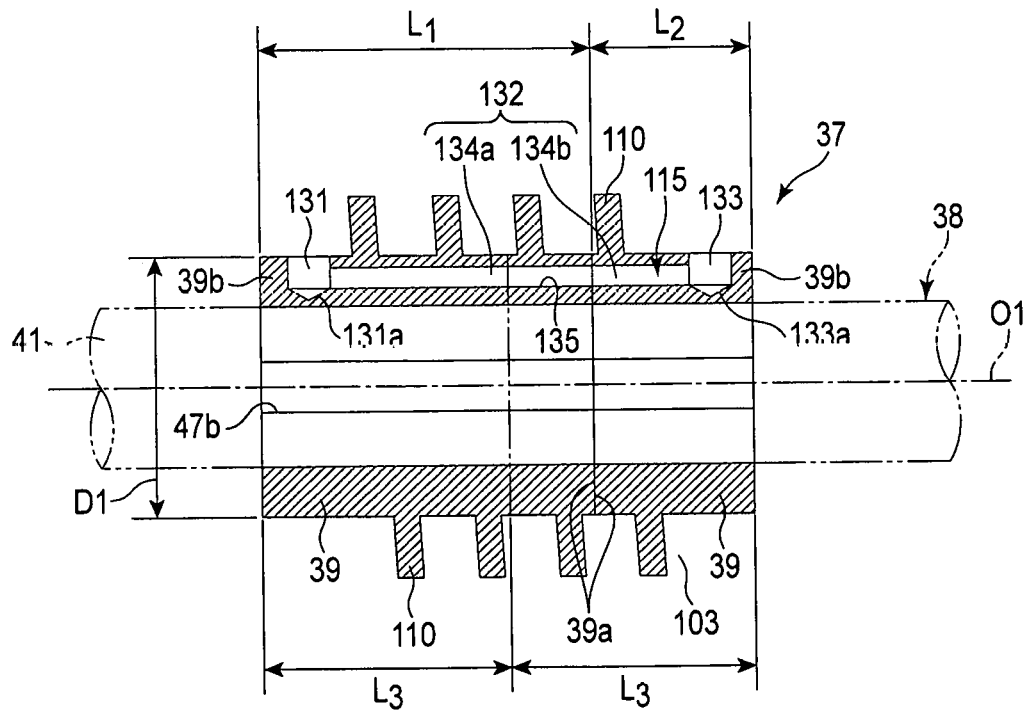
FIG. 33 is a schematic cross-sectional view showing a screw body according to modification 2 of the fourth embodiment.

FIG. 33 shows modification 2 of the fourth embodiment.

In modification 2 shown in FIG. 33, two cylindrical members 39, on which the first flight 110 is formed, have different lengths. More specifically, one of the two cylindrical members 39, which includes the first portion 134a of the second passage element 132, has length L1 longer than length L2 of the other cylindrical member 39 that includes the second portion 134b of the second passage element 132.

In modification 2, if two other cylindrical members 39 having a length L3 along the axis of the rotating shaft 38 are prepared in addition to the above-described two cylindrical members 39 with the first flight 110, the lengths of the two cylindrical members 39 with the first flight 110 can be adjusted in three stages. More specifically, in this case, the combination of the cylindrical members having lengths L1 and L2, the combination of the cylindrical members having lengths L1 and L3, and the combination of the cylindrical members having lengths L2 and L3 become possible. That is, the entire length of the passage 115 can be easily varied.

Modification 3 of Fourth Embodiment

FIGS. 34, 35A, 35B, 36A and 36B show modification 3 associated with modification 1 of the fourth embodiment.

Figure 34:
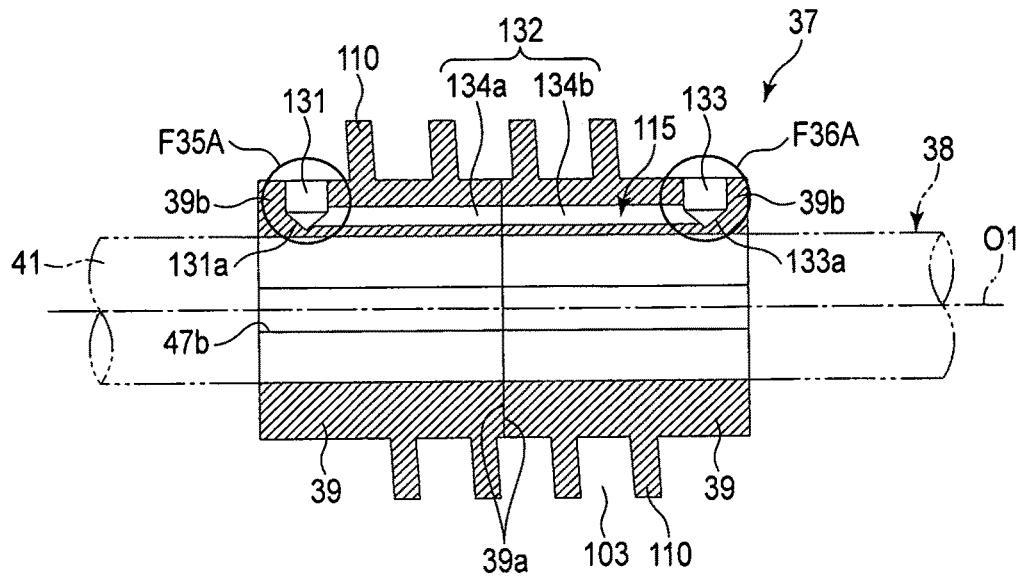
FIG. 34 is a schematic cross-sectional view showing a screw body according to modification 3 of the fourth embodiment.
Figure 35A:
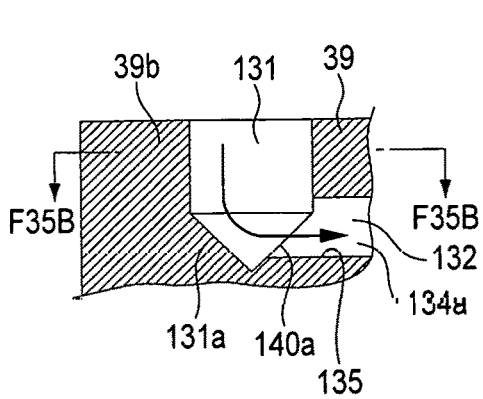
FIG. 35A is an enlarged cross-sectional view showing portion F35A of FIG. 34.
Figure 35B:
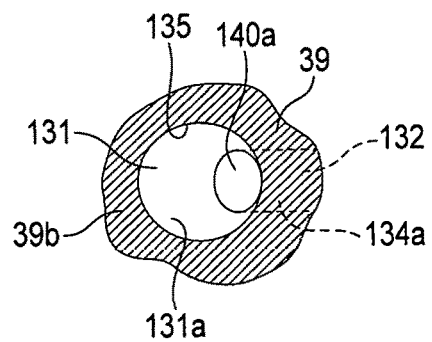
FIG. 35B is a cross-sectional view taken along line F35B-F35B of FIG. 35A.

As shown in FIGS. 34, 35A and 35B, the end of the first portion 134a of the second passage element 132 opposite to the open end thereof is connected to the conical bottom 131a of the first passage element 131 such that it perpendicularly crosses the first passage element 131. The bottom 131a of the first passage element 131 has a circular opening 140a that communicates with the second passage element 132. The opening 140a faces the other portion of the bottom 131a that is, inclined to the outer peripheral surface of the screw body 37.

Figure 36A:
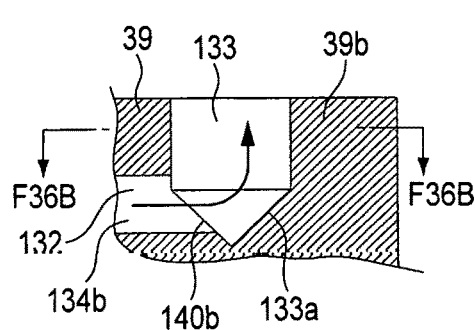
FIG. 36A is an enlarged cross-sectional view showing portion F36A of FIG. 34.
Figure 36B:
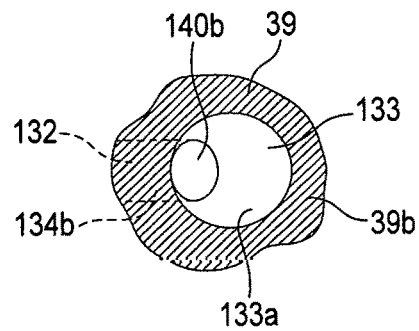
FIG. 36B is a cross-sectional view taken along line F36B-F36B of FIG. 36A.

As shown in FIGS. 34, 36A and 36B, the end of the second portion 134b of the second passage element 132 opposite to the open end thereof is connected to the conical bottom 133a of the third passage element 133 such that it perpendicularly crosses the third passage element 133. The bottom 133a of the third passage element 133 has a circular opening 140b that communicates with the second passage element 132. The opening 140b faces the other portion of the bottom 133a that is inclined to the outer peripheral surface of the screw body 37.

In modification 3, the raw material having flown into the first passage element 131 and reached the bottom 131a of the first passage element 131 is guided to the opening 140a along the slope of the bottom 131a, as is indicated by the arrow in FIG. 35A. Thus, the raw material smoothly flows to the second passage element 132 without stagnation at the bottom 131a of the first passage element 131.

The raw material passing through the second passage element 132 flows to the bottom 133a of the third passage element 133 through the opening 140b. The raw material reaching the third passage element 133 is guided to the outer peripheral surface of the screw body 37 along the slope of the bottom 133a, as is indicated by the arrow in FIG. 36A. Thus, the raw material is smoothly returned to the outer peripheral surface of the screw body 37 without stagnation at the bottom 133a of the third passage element 133.

As described above, local stagnation of the raw material in the passage 115 can be avoided, whereby a desired extension action can be applied to the raw material passing through the passage 115.

In modification 3, the bottom 131a of the first passage element 131 and the bottom 133a of the third passage element 133 are not limited to the conical shape, but may be, for example, a hemispherical shape.

Modification 4 of Fourth Embodiment

Figure 37:
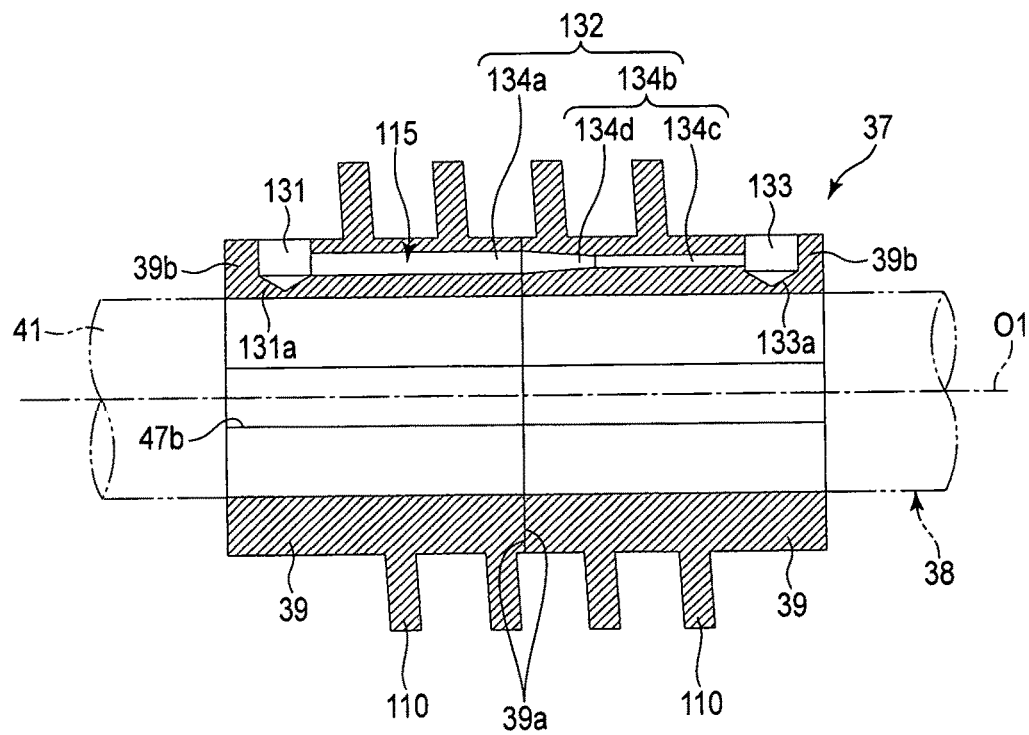
FIG. 37 is a schematic cross-sectional view showing a screw body according to modification 4 of the fourth embodiment.

FIG. 37 shows modification 4 associated with modification 1 of the fourth embodiment.

Modification 4 differs from modification 1 in the structure of the second portion 134b of the second passage element 132. As shown in FIG. 37, the second portion 134b has a straight portion 134c and a tapered portion 134d. The straight portion 134c and the tapered portion 134d are formed by cutting the cylindrical member 39 from the end face 39a side of the cylindrical member 39.

The straight portion 134c is connected to the third passage element 133. The inner diameter of the straight portion 134c is smaller than that of the first portion 134a of the second passage element 132. The tapered portion 134d is open to the end face 39a of the other cylindrical member 39, and is coaxially connected to the straight portion 134c. The inner diameter of the tapered portion 134d is gradually decreased from the end face 39a of the other cylindrical member 39 to the straight portion 134c. This means that the inner diameter of the second passage element 132 as a main element for applying an extension action to the raw material is varied in its middle portion with respect to the flow of the raw material.

The tapered portion 134d is formed by, for example, forming a prepared hole in the end face 39a of the other cylindrical member 39, and then cutting the inner peripheral surface of the prepared hole using a taper reamer. The prepared hole also serves as the straight portion 134c.

In modification 4, the second portion 134b of the second passage element 132 has the tapered portion 134d that is located upstream of the straight portion 134c at the middle portion of the second passage element 132. Thus, the second passage element 132 has its middle portion gradually reduced in inner diameter, which strengthens the extension action exerted on the raw material when the raw material is passed through the second passage element 132.

Modification 5 of Fourth Embodiment

Figure 38:
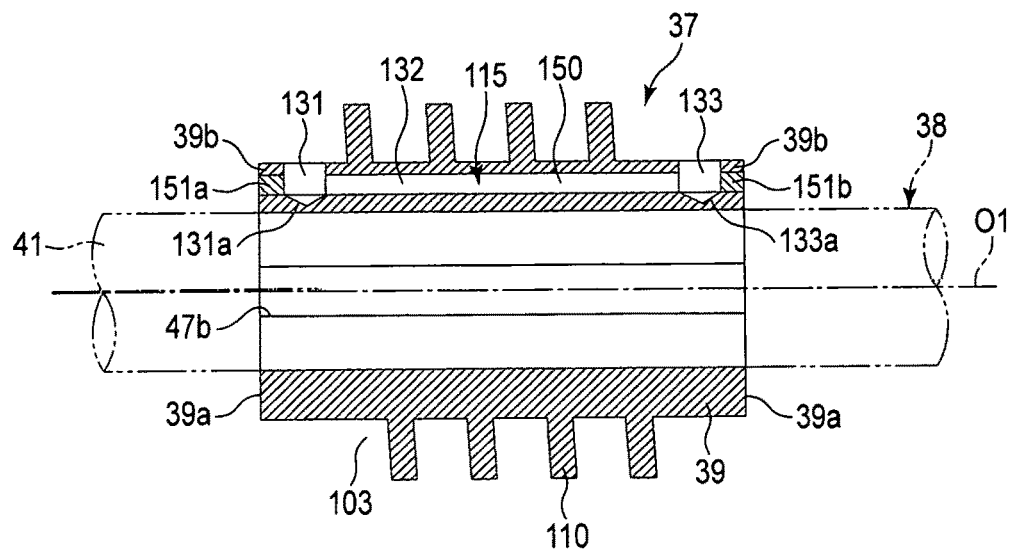
FIG. 38 is a schematic cross-sectional view showing a screw body according to modification 5 of the fourth embodiment.

FIG. 38 shows modification 5 of the fourth embodiment.

In modification 5 shown in FIG. 38, the passage 115 is formed in one of the cylindrical members 39. The second passage element 132 of the passage 115 is formed by, for example, performing a machining process on the one cylindrical member 39 from the end face 39a side of the same, using, for example, a drill.

As a result, a through hole 150 having a circular cross section is formed through the cylindrical member 39 along the axis thereof, such that it opens to the opposite end faces 39a of the cylindrical member 39. The through hole 150 intersects the first and third passage elements 131 and 133 in the cylindrical member 39.

The opposite open ends of the through hole 150 are individually liquid-tightly blocked by caps 151a and 151b. This structure defines, in one cylindrical member 39, the second passage element 132 that connects the first and third passage elements 131 and 133.

When the through hole 150 is formed in the cylindrical member 39, the distal end of the through hole 150 may be blocked by the end wall 39b of the cylindrical member 39, instead of making the distal end communicate with the end face 39a of the cylindrical member 39.

Modification 6 of Fourth Embodiment

Figure 39:
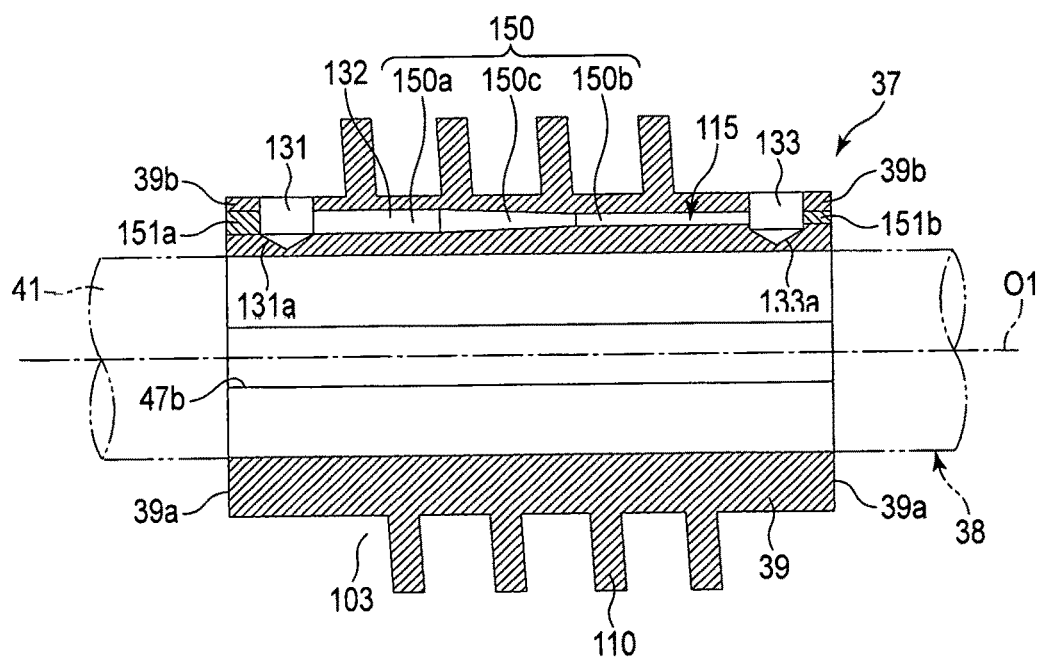
FIG. 39 is a schematic cross-sectional view showing a screw body according to modification 6 of the fourth embodiment.

FIG. 39 shows modification 6 obtained by further developing modification 5.

As shown in FIG. 39, the through hole 150 that extends through one cylindrical member 39 includes an upstream portion 150a, a downstream portion 150b and a middle portion 150c. The upstream portion 150a, the downstream portion 150b and the middle portion 150c are coaxially arranged along the axis of the cylindrical member 39. The upstream portion 150a intersects the first passage element 131 in the cylindrical member 39, and opens to one end face 39a of the cylindrical member 39. The open end of the upstream portion 150a is liquid-tightly blocked by a cap 151a.

The inner diameter of the downstream portion 150b is smaller than that of the upstream portion 150a. The downstream portion 150b intersects the third passage element 133 in the cylindrical member 39, and opens to the other end face 39a of the cylindrical member 39. The open end of the downstream portion 150b is liquid-tightly blocked by a cap 151b.

The middle portion 150c is located between the upstream portion 150a and the downstream portion 150b. The inner diameter of the middle portion 150c is gradually decreased from the upstream portion 150a side to the downstream portion 150b side. Accordingly, the inner diameter of the second passage element 132 as a main element for applying an extension action to the raw material is varied in an intermediate position with respect to the direction of flow of the raw material.

As described above, in the second passage element 132 of the passage 115 according to modification 6, the inner diameter of the middle portion 150c is gradually decreased from the upstream side to the downstream side. Therefore, the extension action applied to the raw material is strengthened when the raw material passes through the second passage element 132.

Fifth Embodiment

Figure 40:
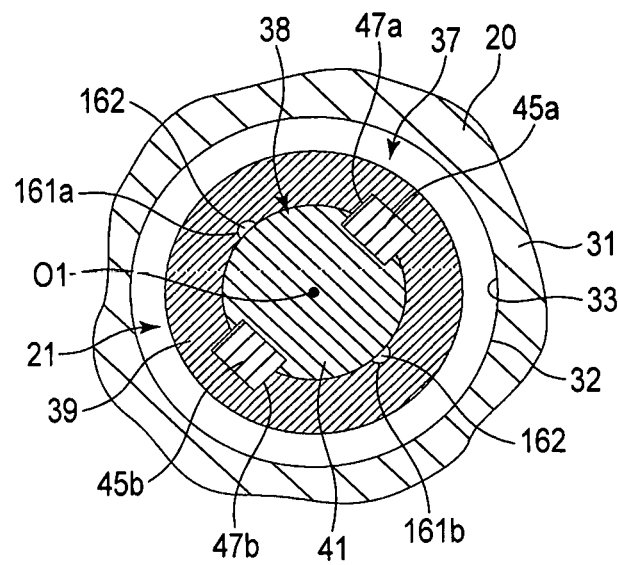
FIG. 40 is a cross-sectional view of a second extruder according to a fifth embodiment.

FIG. 40 shows a fifth embodiment. The fifth embodiment differs from the first embodiment in the structure for applying an extension action to raw materials. The other structures of the screw 21 are similar to those of the first embodiment.

As shown in FIG. 40, a pair of slots 161a and 161b are formed in the inner peripheral surface of the cylindrical member 39. Slots 161a and 161b extend along the axis of the screw body 37, and are separate from each other diametrically with respect to the screw body 37. Further, slots 161a and 161b are open to the inner peripheral surface of the cylindrical member 39.

The open ends of slots 161a and 161b are blocked by the outer peripheral surface of the second shaft portion 41 of the rotating shaft 38 when the cylindrical member 39 is fitted on the second shaft portion 41. Thus, slots 161a and 161b cooperate with the outer peripheral surface of the second shaft portion 41 to define passages 162 for applying an extension action to raw materials. In the embodiment, the passages 162 are located at the boundary areas of the rotating shaft 38 and the cylindrical member 39.

In the fifth embodiment, the passages 162 are located in the screw body 37 in positions eccentric with respect to axis O1 of the rotating shaft 38. Therefore, the passages 162 revolve around axis O1 when the screw body 37 rotates, as in the first embodiment.

In the fifth embodiment, when the cylindrical member 39 is fitted on the second shaft portion 41 of the rotating shaft 38, the passages 162 are formed in the screw body 37. Since slots 161a and 161b defining the passages 162 are open to the inner peripheral surface of the cylindrical member 39, they can be easily formed.

Therefore, when it is necessary to change, for example, the sectional shape of each passage 162, this can be easily dealt with.

Sixth Embodiment

Figure 41:
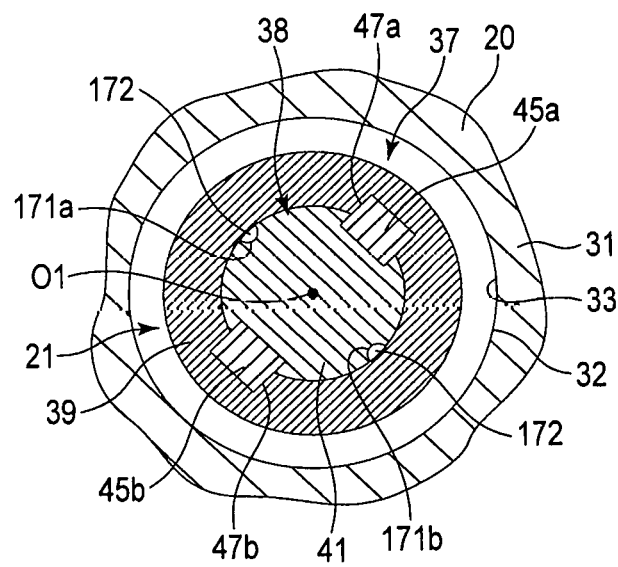
FIG. 41 is a cross-sectional view of a second extruder according to a sixth embodiment.

FIG. 41 shows a sixth embodiment. The sixth embodiment differs from the fifth embodiment in the structure for applying an extension action to raw materials. The other structures of the screw 21 are similar to those of the fifth embodiment.

As shown in FIG. 41, a pair of slots 171a and 171b are formed in the outer peripheral surface of the second shaft portion 41 of the rotating shaft 38. Slots 171a and 171b extend along the axis of the second shaft portion 41, and are separate from each other diametrically. Further, slots 171a and 171b are open to the outer peripheral surface of the second shaft portion 41.

The open ends of slots 171a and 171b are blocked by the inner peripheral surface of the cylindrical member 39 when the cylindrical member 39 is fitted on the second shaft portion 41 of the rotating shaft 38. Thus, slots 171a and 171b cooperate with the inner peripheral surface of the cylindrical member 39 to define passages 172 for applying an extension action to raw materials. In the embodiment, the passages 172 are located at the boundary areas of the rotating shaft 38 and the cylindrical member 39.

In the sixth embodiment, the passages 172 are located in the screw body 37 in positions eccentric with respect to axis O1 of the rotating shaft 38. Therefore, the passages 172 revolve around axis O1 when the screw body 37 rotates, as in the fifth embodiment.

In the sixth embodiment, when the cylindrical member 39 is fitted on the second shaft portion 41 of the rotating shaft 38, the passages 172 are formed in the screw body 37. Since slots 171a and 171b defining the passages 172 are open to the outer peripheral surface of the rotating shaft 38, they can be easily formed.

Therefore, when it is necessary to change, for example, the sectional shape of each passage 172, this can be easily dealt with.

Seventh Embodiment

Figure 42:
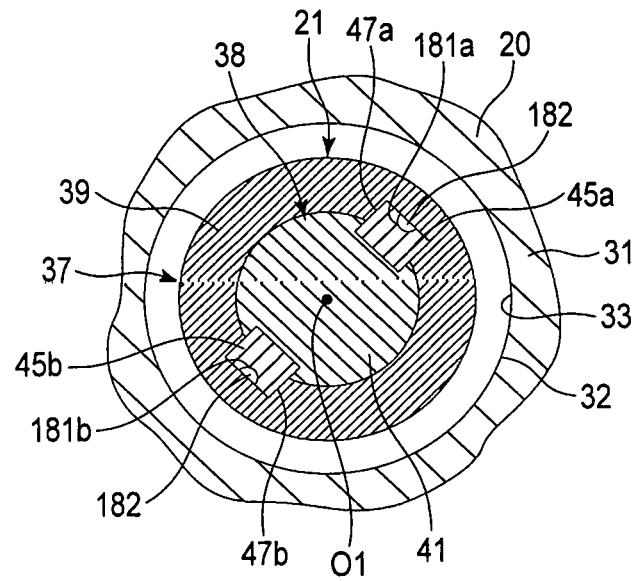
FIG. 42 is a cross-sectional view of a second extruder according to a seventh embodiment.

FIG. 42 shows a seventh embodiment. The seventh embodiment differs from the first embodiment in the structure for applying an extension action to raw materials. The other structures of the screw 21 are similar to those of the first embodiment.

As shown in FIG. 42, recesses 181a and 181b are formed in the distal end faces of keys 45a and 45b projecting from the outer peripheral surface of the second shaft portion 41. Recesses 181a and 181b are formed along the axis of the second shaft portion 41 and are open to the distal end faces of keys 45a and 45b. The open ends of recesses 181a and 181b are blocked by the inner peripheral surfaces of key grooves 47a and 47b formed in the cylindrical member 39, when keys 45a and 45b are engaged with key grooves 47a and 47b, respectively. Thus, recesses 181a and 181b cooperate with the inner peripheral surfaces of key grooves 47a and 47b to define passages 182 for applying an extension action to raw materials. In the embodiment, the passages 182 are located at the boundary areas of keys 45a and 45b and the cylindrical member 39.

In the seventh embodiment, the passages 182 are located in the screw body 37 in positions eccentric with respect to axis O1 of the rotating shaft 38. Therefore, the passages 182 revolve around axis O1 when the screw body 37 rotates, as in the fifth embodiment.

In the seventh embodiment, when keys 45a and 45b of the rotating shaft 38 are engaged with key grooves 47a and 47b of the cylindrical member 39, the passages 182 are formed in the screw body 37. Since recesses 181a and 181b defining the passages 182 are open to the distal end faces of keys 45a and 45b, they can be easily formed.

Therefore, when it is necessary to change, for example, the sectional shape of each passage 182, this can be easily dealt with.

The seventh embodiment may be modified such that other recesses extending along the axis of the second shaft portion 41 are formed in the inner peripheral surfaces of key grooves 47a and 47b, and are coupled to recesses 181a and 181b to thereby define the passages 182.

Eighth Embodiment

Figure 43:
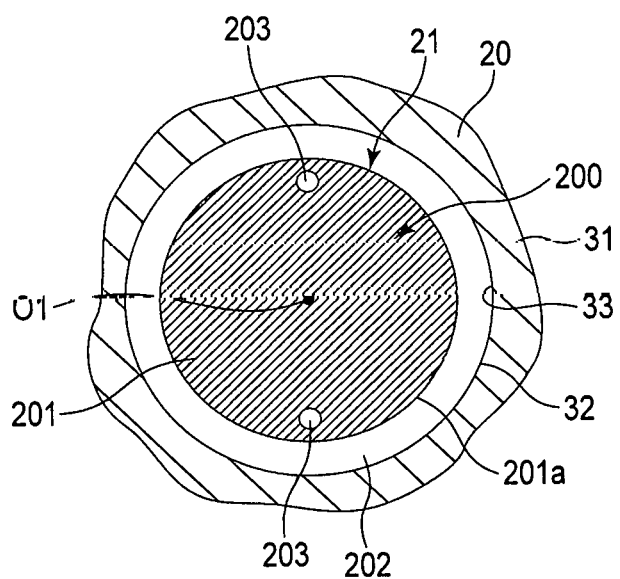
FIG. 43 is a cross-sectional view of a second extruder according to an eighth embodiment.

FIG. 43 shows an eighth embodiment. The eighth embodiment differs from the first embodiment in the structure of the screw 21 and the structure for applying an extension action to raw materials.

As shown in FIG. 43, the screw 21 comprises a solid screw body 200. The screw body 200 comprises one straight axial member 201. The axial member 201 has an axis O1 extending through its central portion, and is concentrically contained in the cylindrical portion 33 of the barrel 20.

The axial member 201 has an outer peripheral surface 201a that faces the inner peripheral surface of the cylindrical portion 33 of the barrel 20. Flight 202 for conveying the raw materials is formed on the outer peripheral surface 201a of the axial member 201.

Furthermore, a pair of passages 203 for applying an extension action to raw materials are formed in the axial member 201. The passages 203 extend along the axis of the axial member 201 in parallel with each other, with axis O1 interposed therebetween. Thus, the passages 203 are arranged in the screw body 200 in positions eccentric with respect to axis O1 of the axial member 201. As a result, the passages 203 revolve around axis O1 when the screw body 200 rotates, as in the first embodiment.

The passages 203 for applying the extension action to raw materials can be formed in the screw body 200 even when the screw body 200 is formed of the axial member 201. Therefore, the screw body is not limited to a structure as a combination of a rotating shaft and cylindrical members.

The above-described embodiments are presented just as examples, and are not intended to limit the scope of the invention. The embodiments may be modified in various ways without departing from the scope. For instance, various omissions, replacements, changes, etc., may be made.

For instance, the passage for applying an extension action to raw materials is not limited to a hole having a circular cross section. It may be a hole having, for example, an elliptical or polygonal cross section.

In addition, the first embodiment is directed to an example case where the screw 21 is rotated counterclockwise when the screw body 37 is viewed from the proximal end of the rotating shaft 38. However, the invention is not limited to this. For instance, the screw 21 may be rotated clockwise.

In this case, flight 56 provided on the conveyance portion 54 of the screw 21 may be twisted clockwise like a right-handed screw so as to convey raw materials from the distal end side of the screw body 37 to the proximal end side of the same. Similarly, flight 57 provided on the barrier portion 55 may be twisted counterclockwise like a left-handed screw so as to convey the materials from the proximal end side of the screw body 37 to the distal end side of the same.

Also, the third extruder for removing a gas component from a kneaded material extruded from the second extruder 3 is not limited to a uniaxial extruder, but may be a biaxial extruder.

It is sufficient if the continuous high-shearing molding apparatuses according to the embodiments employ at least the first extruder for preliminarily kneading raw materials and the second extruder for completely kneading them. The third extruder for removing a gaseous material or a volatile component may be omitted. When the third extruder is omitted, it is advisable to provide the intermediate portion of the second extruder with at least one vent for removing a gaseous material or a volatile component from a currently kneaded material.

What is claimed is:

1. An extruder screw for conveying a raw material while kneading the raw material, comprising:
   a screw body which has an axis extending in a direction of conveyance of the raw material, and is rotated about the axis, the screw body comprising a rotating shaft and a plurality of cylindrical members coaxially inserted around the rotating shaft;
   a conveyance portion provided on an outer peripheral surface of the cylindrical members of the screw body and including a flight, the flight being configured to convey the raw material along the axis of the screw body when the screw body is rotated;
   and a plurality of passages provided in the screw body and extending along the axis of the screw body,
   each passage of the plurality of passages comprising an inlet which is open to the outer peripheral surface of one of the cylindrical members and an outlet which is open to the outer peripheral surface of another of the cylindrical members that is disposed adjacent to said one cylindrical member, and a main passage portion formed in said one and said another cylindrical members that are disposed adjacent to each other, and
   the plurality of passages being provided in respective positions deviated from the axis of the screw body, the raw material conveyed by the flight flowing into the passages through the inlets and flowing through the main passage portions to the outlets.

2. The extruder screw of claim 1, wherein each of the passages is configured to revolve around the axis when the screw body is rotated.

3. The extruder screw of claim 2, wherein the cylindrical members of the screw body further comprise a cylindrical wall which defines all of the passages, and the cylindrical wall is configured to revolve around the axis.

4. The extruder screw of claim 1, wherein the cylindrical members of the screw body further comprise a cylindrical wall which defines all of the passages, and the cylindrical wall is configured to revolve around the axis.

5. The extruder screw of claim 1, wherein the screw body has a barrier portion configured to increase pressure of the raw material by restricting the flow of the raw material using a flight of the barrier portion, and the inlets are positioned in front of the barrier portion.

6. The extruder screw of claim 5, wherein each of the main passage portions has a diameter smaller than a diameter of the inlets.

7. The extruder screw of claim 1 wherein each of the main passage portions has a diameter smaller than a diameter of the inlet.

8. The extruder screw of claim 1, further comprising a coolant passage in the screw body configured to permit a coolant for cooling the screw body to flow therein.

9. An extruder including the screw recited in claim 1 and configured to knead a raw material using the screw to produce a kneaded product, the extruder comprising:
   a barrel containing the screw such that the screw is rotatable;

a feed port provided in the barrel to feed the raw material to the screw; and a discharge port provided in the barrel to discharge the kneaded product.

10. An extrusion method using the extruder screw of claim 1, the extrusion method comprising:

feeding the raw material to the screw rotating in a barrel, and continuously conveying the raw material along an axis of the screw, using the flight formed on the outer peripheral surface; and guiding the raw material conveyed by the flight to the plurality of passages which extend along a portion of the screw body, revolving the plurality of passages in accordance with rotation of the screw, and returning the raw material through all of the passages to the outer peripheral surface.

11. The extrusion method of claim 10, further comprising restricting flow of the raw material using a barrier portion provided in the screw, to increase pressure of the raw material, and introducing the pressure-increased raw material into all of the passages from the outer peripheral surface.

\* \* \* \* \*